(12) United States Patent
Cai et al.

(10) Patent No.: US 11,888,167 B2
(45) Date of Patent: Jan. 30, 2024

(54) CATALYST FOR RECHARGEABLE ENERGY STORAGE DEVICES AND METHOD FOR MAKING THE SAME

(71) Applicant: Nanyang Technological University, Singapore (SG)

(72) Inventors: Xiaoyi Cai, Singapore (SG); Zexiang Shen, Singapore (SG); Linfei Lai, Singapore (SG)

(73) Assignee: Nanyang Technological University, Singapore (SG)

( * ) Notice: Subject to any disclaimer, the term of this patent is extended or adjusted under 35 U.S.C. 154(b) by 157 days.

(21) Appl. No.: 17/393,045

(22) Filed: Aug. 3, 2021

(65) Prior Publication Data
US 2022/0037675 A1    Feb. 3, 2022

(30) Foreign Application Priority Data
Aug. 3, 2020 (SG) .............................. 10202007375S

(51) Int. Cl.
| | |
|---|---|
| H01M 4/90 | (2006.01) |
| H01M 4/86 | (2006.01) |
| H01M 4/88 | (2006.01) |
| H01M 12/08 | (2006.01) |

(52) U.S. Cl.
CPC ....... *H01M 4/9041* (2013.01); *H01M 4/8652* (2013.01); *H01M 4/8825* (2013.01); *H01M 4/8882* (2013.01); *H01M 4/8892* (2013.01); *H01M 4/9083* (2013.01); *H01M 12/08* (2013.01)

(58) Field of Classification Search
None
See application file for complete search history.

(56) References Cited

U.S. PATENT DOCUMENTS

2012/0252662 A1 * 10/2012 Assmann ............... B01J 21/185
977/773

FOREIGN PATENT DOCUMENTS

CN    109346728    * 2/2019

OTHER PUBLICATIONS

Cai et al., "Free-standing vertically-aligned nitrogen-doped carbon nanotube arrays/graphene as air-breathing electrodes for rechargeable zinc-air batteries," *J. Mater. Chem. A* 5: 2488-2495, Jan. 13, 2017.

(Continued)

*Primary Examiner* — Jonathan Crepeau
(74) *Attorney, Agent, or Firm* — Seed IP Law Group LLP

(57) ABSTRACT

According to various aspects of the present disclosure, a catalyst for rechargeable energy storage devices having a first transition metal and a second transition metal, wherein the first and second transition metals are formed on carbon nanotubes, the carbon nanotubes are doped with nitrogen and phosphorous, wherein the carbon nanotubes have edges and interlayer spaces and are axially aligned, and the first and second transition metals form bimetal centers, wherein the bimetal centers may be uniformly distributed catalytic active sites located at the edges or the interlayer spaces of the carbon nanotubes providing intercalated layers. The present FeCo—NPCNTs are a morphology-dependent catalyst that provides effective performance for bifunctional oxygen reduction reaction and oxygen evolution reaction in metal-air-cells and fuel cells.

14 Claims, 24 Drawing Sheets

(56) References Cited

OTHER PUBLICATIONS

Chen et al., "Atomically Dispersed Iron-Nitrogen Species as Electrocatalysts for Bifunctional Oxygen Evolution and Reduction Reactions," *Angew. Chem. Int. Ed.* 56:610-614, 2017.
Chen et al., "Nitrogen-rich Fe—N—C materials derived from polyacrylonitrile as highly active and durable catalysts for the oxygen reduction reaction in both acidic and alkaline electrolytes," *Journal of Colloid and Interface Science* 502:44-51, Apr. 5, 2017.
Cheng et al., "Cu—Co Bimetallic Oxide Quantum Dot Decorated Nitrogen-Doped Carbon Nanotubes: A High-Efficiency Bifunctional Oxygen Electrode for Zn—Air Batteries," *Adv. Funct. Mater.* 27:1701833, 2017, (10 pages).
Cheng et al., "Efficient and Durable Bifunctional Oxygen Catalysts Based on NiFeO@MnO$_x$ Core-Shell Structures for Rechargeable Zn—Air Batteries," *ACS Appl. Mater. Interfaces* 9:8121-8133, Feb. 16, 2017.
Chung et al., "Low-Temperature and Gram-Scale Synthesis of Two-Dimensional Fe—N—C Carbon Sheets for Robust Electrochemical Oxygen Reduction Reaction," *Chem. Mater* 29:2890-2898, 2017.
Deng et al., "Well-Defined ZIF-Derived Fe—N Codoped Carbon Nanoframes as Efficient Oxygen Reduction Catalysts," *ACS Appl. Mater. Interfaces* 9:9699-9709, Feb. 28, 2017.
Fan et al., "Ni—Fe Nitride Nanoplates on Nitrogen-Doped Graphene as a Synergistic Catalyst for Reversible Oxygen Evolution Reaction and Rechargeable Zn—Air Battery," *Small Journal* 13:1700099, 2017, (8 pages).
Fu et al., "Co—N Decorated Hierarchically Porous Graphene Aerogel for Efficient Oxygen Reduction Reaction in Acid," *ACS Appl. Mater. Interfaces* 8:6488-6495, Mar. 3, 2016.
Fu et al., "Hierarchically mesoporous nickel-iron nitride as a cost-efficient and highly durable electrocatalyst for Zn—air battery," *Nano Energy* 39:77-85, Jun. 15, 2017.
Guo et al., "Active sites of nitrogen-doped carbon materials for oxygen reduction reaction clarified using model catalysts," *Science Mag* 351(6271):361-365, Jan. 22, 2016 (6 pages).
Ha et al., "The structural evolution and diffusion during the chemical transformation from cobalt to cobalt phosphide nanoparticles," *J. Mater. Chem.* 21:11498-11510, Mar. 20, 2011.
Holewinski et al., "Elementary Mechanisms in Electrocatalysis: Revisiting the ORR Tafel Slope," *Journal of the Electrochemical Society* 159(11): H864-H870, Sep. 5, 2012.
Hu et al., "Hollow Spheres of Iron Carbide Nanoparticles Encased in Graphitic Layers as Oxygen Reduction Catalysts," *Angew. Chem. Int. Ed.* 53:3675-3679, 2014.
Lai et al., "Exploration of the active center structure of nitrogen-doped graphene-based catalysts for oxygen reduction reaction," *Energy Environ. Sci.* 5:7936-7942, Apr. 25, 2012.
Li et al., "Functional Links between Pt single crystal morphology and nanoparticles with different size and shape: the oxygen reduction reaction case," *Energy & Environmental Science* 7:4061-4069, Oct. 1, 2014.
Liang et al., "Mesoporous Metal-Nitrogen-Doped Carbon Electrocatalysts for Highly Efficient Oxygen Reduction Reaction," *J. Am. Chem. Soc.* 135:16002-16005, Oct. 15, 2013.
Lin et al., "Noble-Metal-Free Fe—N/C Catalyst for Highly Efficient Oxygen Reduction Reaction under Both Alkaline and Acidic Conditions," *J. Am. Chem. Soc.* 136:11027-11033, Jul. 24, 2014.
Liu et al., "High-Performance Oxygen Reduction Electrocatalysts based on Cheap Carbon Black, Nitrogen, and Trace Iron," *Adv. Materials* 25:6879-6883, 2013.
Liu et al., "PEM fuel cell electrocatalysts based on transition metal macrocyclic compounds," *Coordination Chemistry Reviews* 315:153-177, Feb. 21, 2016.
Liu et al., "Single-atom dispersed Co-N-C catalyst: structure identification and performance for hydrogenative coupling of nitroarenest," *Chem. Sci.* 7:5758-5764, Jun. 11, 2016.
Liu et al., "Synthesis and characterization of carbon incorporated Fe—N/carbons for methanol- tolerant oxygen reduction reaction of polymer electrolyte fuel cells," *Journal of Power Sources* 250:279-285, Nov. 19, 2013 (2014).
Maldonado-Hódar et al., "Catalytic Graphitization of Carbon Aerogels by Transition Metals," *Langmuir* 16:4367-4373, Jan. 5, 2000.
Meng et al., "In Situ Coupling of Strung Co4N and Intertwined N—C Fibers toward Free-Standing Bifunctional Cathode for Robust, Efficient, and Flexible Zn—Air Batteries," *J. Am. Chem. Soc.* 138:10226-10231, Jul. 27, 2016.
Park et al., "3D Ordered Mesoporous Bifunctional Oxygen Catalyst for Electrically Rechargeable Zinc—Air Batteries," *Small Journal* 12(20):2707-2714, 2016.
Parvez et al., "Nitrogen-Doped Graphene and Its Iron-Based Composite As Efficient Electrocatalysts for Oxygen Reduction Reaction," *ACS Nano* 6(11):9541-9550, Oct. 10, 2012.
Qing et al., "P/N/O co-doped carbonaceous material based supercapacitor with voltage up to 1.9 V in aqueous electrolyte," *RSC Adv.* 4:55971-55979, Oct. 20, 2014.
Ramaswamy et al., "Activity Descriptor Identification for Oxygen Reduction on Nonprecious Electrocatalysts: Linking Surface Science to Coordination Chemistry," *J. Am. Chem. Soc.* 135:15443-15449, Sep. 13, 2013.
Sanetuntikul et al., "High pressure pyrolyzed non-precious metal oxygen reduction catalysts for alkaline polymer electrolyte membrane fuel cells," *Nanoscale* 7:7644-7650, Mar. 18, 2015.
Serov et al., "Fe—N—C Oxygen Reduction Fuel Cell Catalyst Derived from Carbendazim: Synthesis, Structure, and Reactivity," *Adv. Energy Mater.* 4:1301735, 2014, (7 pages).
Shen et al., "Oxygen Reduction Reaction in a Droplet on Graphite: Direct Evidence that the Edge Is More Active than the Basal Plane," *Angew. Chem.* 126:10980-10984, 2014.
Shui et al., "Fe/N/C Composite in Li—O$_2$ Battery: Studies of Catalytic Structure and Activity toward Oxygen Evolution Reaction," *J. Am. Chem. Soc.* 134:16654-16661, Sep. 21, 2012.
Strickland et al., "Highly active oxygen reduction non-platinum group metal electrocatalyst without direct metal-nitrogen coordination," *Nature Communications* 6(7343): 1-8, Jun. 10, 2015.
Su et al., "Atomic Modulation of FeCo-Nitrogen-Carbon Bifunctional Oxygen Electrodes for Rechargeable and Flexible All-Solid-State Zinc—Air Battery," *Adv. Energy Mater.* 7:1602420, 2017, (12 pages).
Wang et al., "An Efficient Bifunctional Electrocatalyst for a Zinc—Air Battery Derived from Fe/N/C and Bimetallic Metal-Organic Framework Composites," *ACS Appl. Mater. Interfaces* 9:5213-5221, Jan. 20, 2017.
Wang et al., "Bifunctional Transition Metal Hydroxysulfides: Room-Temperature Sulfurization and Their Applications in Zn—Air Batteries," *Adv. Mater.* 29:1702327, 2017, (9 pages).
Wang et al., "Continuous fabrication of a MnS/Co nanofibrous air electrode for wide integration of rechargeable zinc—air batteries," *Nanoscale* 9:15865-15872, Sep. 13, 2017.
Wang et al., "Pyrolyzed Fe—N—C Composite as an Efficient Non-precious Metal Catalyst for Oxygen Reduction Reaction in Acidic Medium," *ACS Catal.* 4:3928-3936, Sep. 23, 2014.
Wu et al., "Iron Carbide Nanoparticles Encapsulated in Mesoporous Fe—N-Doped Carbon Nanofibers for Efficient Electrocatalysis," *Angew. Chem. Int. Ed.* 54:8179-8183, 2015.
Wu et al., "Phosphorous-doped porous carbons as efficient electrocatalysts for oxygen reduction," *J. Mater. Chem. A.* 1:9889-9896, Jun. 20, 2013.
Wu et al., "Transition metal-assisted carbonization of small organic molecules toward functional carbon materials," *Sci. Adv.* 4:eaat0788, Jul. 27, 2018, (11 pages).
Xiao et al., "Fe—N-carbon black for the oxygen reduction reaction in sulfuric acid," *SciVerse ScienceDirect* 57:443-451, Feb. 10, 2013.
Yin et al., "Hybrid of Iron Nitride and Nitrogen-Doped Graphene Aerogel as Synergistic Catalyst for Oxygen Reduction Reaction," *Adv. Fund. Mater.* 24:2930-2937, 2014.
You et al., "High-Performance Overall Water Splitting Electrocatalysts Derived from Cobalt-Based Metal-Organic Frameworks," *Chem. Mater.* 27:7636-7642, Nov. 5, 2015.

(56) References Cited

OTHER PUBLICATIONS

Zang et al., "Fe/Fe$_2$O$_3$ nanoparticles anchored on Fe—N-doped carbon nanosheets as bifunctional oxygen electrocatalysts for rechargeable zinc—air batteries," *Nano Research* 9(7):2123-2137, Apr. 14, 2016.

Zhang et al., "Porous polyaniline-derived FeNxC/C catalysts with high activity and stability towards oxygen reduction reaction using ferric chloride both as an oxidant and iron source," *J. Mater. Chem. A* 2:1242-1246, Nov. 26, 2013 (2014).

Zhao et al., "Efficient Bifunctional Fe/C/N Electrocatalysts for Oxygen Reduction and Evolution Reaction," *The Journal of Physical Chemistry* 119:2583-2588, Jan. 9, 2015.

\* cited by examiner

US 11,888,167 B2

CATALYST FOR RECHARGEABLE ENERGY STORAGE DEVICES AND METHOD FOR MAKING THE SAME

PRIORITY APPLICATION

This application is related to and claims the benefits of Singapore Provisional Patent Application No. 10202007375S entitled "Catalyst for Fuel Cells and Metal-air Cells Derived from Polyaniline-Phytic Acid Composite, CNTs and Transition Metal Centers" filed on Aug. 3, 2020. The priority application is hereby incorporated by reference for all purposes.

FIELD OF TECHNOLOGY

This disclosure relates to rechargeable energy storage devices, including aqueous metal-air cells, alkaline fuel cells, and other batteries, and the preparation of aligned carbon nanotubes with transition metal catalyst sites.

BACKGROUND

Electrochemical energy storage devices, such as fuel cells and metal-air cells, are currently extensively studied and proposed for use as clean power sources. The ubiquitous portable devices that are used every day, worldwide are powered by batteries. Battery power is essential for our laptops, cell phones, personal digital assistants, and increasingly electric vehicles. However, for applications such as electric vehicles, the energy densities of lithium (Li) ion batteries are often not sufficient. The principal drawback of batteries is their frequent need for recharging or replacement altogether. Increasingly, the zinc-air battery is being used as a new choice of power for handheld electronics, providing up to three times the energy of common Li-ion batteries in a more compact package.

In these energy storage devices, one necessary reaction at the cathode is the catalysis of oxygen reduction reaction (ORR), which is the rate-determining factor affecting overall battery performance and is a major challenge in battery development. Oxygen evolution reaction (OER) is also an important process in energy conversion and storage, which determines the charging efficiency of the Zn-air battery. The ORR is normally very sluggish as it is a complex reaction involving the transfer of multiple electrons. Therefore, to increase the rate of ORR for enhanced system performances, efficient electrocatalysts are essential.

The use of single atom and sub-nanometer catalysts, with both precious metal and transition metal catalysts, has drawn significant interest due to their high activity. In particular, metal-nitrogen structures may provide the most active non-noble metal ORR catalytic centers. Iron (Fe), nitrogen (N) and carbon (C), and cobalt (Co), N, and C may have useful catalytic activity for OER and ORR with acidic, alkaline, as well as organic electrolytes. However, the activity of non-noble metal catalysts may still be typically less than that of precious metal catalysts. One of the possible solutions to increasing the activity of non-noble metal catalysts may be to have exposed active centers by reducing the particle size. This possible solution has lead to single atoms and sub-nanometer catalysts attracting significant research interest. The performance of such low-dimensional catalysts may depend on rational design and optimization of their structural properties and chemical environments.

The most commonly used industrial catalysts are platinum (Pt) nanoparticles on carbon black support (Pt/C) and manganese dioxide ($MnO_2$). Most fuel cells use Pt/C as their catalytically active material. While Pt/C has high activity, it has poor durability and batch-to-batch consistency. In addition, the price of Pt/C catalysts is often regarded as the most important factor preventing fuel-cell technology's wide application. For twenty percent Pt/C catalysts, which are typically used as fuel cell cathodes, they will normally cost more than USD 5000 per kilogram for the Pt raw material alone and suppliers will sell their products at more than USD 100 per gram. Therefore, it is understandable that the high price of Pt is an impediment to the large-scale implementation of fuel cells and metal-air batteries.

Alternatively, activated nanosized $MnO_2$ catalysts typically cost USD 70 to 100 per kilogram and more. Presently, $MnO_2$ is the catalyst used in most commercial Zn-air cells. However, the catalytic activity of $MnO_2$ is significantly lower than that of Pt/C and combined with the poor conductivity of $MnO_2$, the cells with $MnO_2$ catalysts are unable to provide the higher power output needed for larger applications.

It is, therefore, desirable to provide the industry with new alternative catalysts that can provide activity similar to Pt/C, but at a cost that is in the range of $MnO_2$.

SUMMARY

The present disclosure relates to catalysts for rechargeable energy storage devices having a first transition metal and a second transition metal, wherein the first and second transition metals are formed on carbon nanotubes (CNT), the carbon nanotubes are doped with nitrogen (N), and phosphorous (P), wherein the carbon nanotubes have edges and interlayer spaces and are axially aligned (i.e., vertically oriented), wherein the carbon nanotubes are coated with intercalated layers, and the first and second transition metals are formed bimetal centers, which may be uniformly distributed, that are principally located at the edges or the interlayer spaces of the carbon nanotubes providing catalytically active sites.

In another aspect, the present disclosure also relates to a method for making catalysts for rechargeable energy storage devices with the steps of forming carbon nanotubes on a template, wherein the carbon nanotubes have edges and interlayer spaces and are axially aligned, doping the carbon nanotubes with N and P, and providing a coating of first transition metal and a second transition metal precursors, and annealing the first and second transition metals to form bimetal centers on carbon nanotubes, wherein the bimetal centers may be uniformly distributed catalytic active sites principally located at the edges or the interlayer spaces of the carbon nanotubes, wherein the interlayer spaces are separated by at least 0.4 nm.

In yet another aspect, the present disclosure further relates to a rechargeable energy storage device having an anode and a cathode, one or both of the anode and the cathode including a catalyst having a bundle of longitudinally aligned graphitic carbon nanotubes including a first and second catalytically active transition metals incorporated longitudinally and atomically distributed at the edges or the interlayer spaces of the carbon nanotubes, wherein the carbon nanotubes are filled with intercalated layers, wherein the carbon nanotubes also include nitrogen and phosphorous atoms and/or ions chemically bonded to the graphitic carbon nanotubes and the transition metals.

In a further aspect, the present disclosure relates to an N, P-doped vertically aligned carbon nanotubes (VACNTs) with uniform distribution of Fe and Co sub-nanometer moieties (i.e., FeCo—NPCNTs) as atomic-scale catalytical active centers for bifunctional ORR and OER catalysis. This composite material may be used as free-standing electrodes for Zn-air batteries. The FeCo—NPCNTs may be prepared by annealing transition metal precursors on the surface of phytic acid doped polyaniline, which may be wrapped onto the surface of each CNT, and followed by removing any excessive transition metals. Sub-nanometer Fe and Co moieties may be present as intercalates between the surface graphitic layers of CNTs, which may form a fishbone-like structure with a large number of exposed edges. For example, FeCo—NPCNTs annealed at approximately 900° C. may provide excellent bifunctional OER and ORR activity and when used for FeCo—NPCNTs-based Zn-air batteries. It may have a peak power density of 95 W cm$^2$, which is higher than that of Pt/C/IrO2 counterparts that have a peak power of 57 W cm$^2$. In addition, rechargeable Zn-air batteries using the present catalysts may achieve a stable operation of over 285 hours with only a roundtrip efficiency decrease of less than one percent.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the present disclosure. The dimensions of the various features or elements may be arbitrarily expanded or reduced for clarity.

In the below description, various aspects of the present disclosure relating to the FeCo—NPCNTs are described with reference to the following drawings.

DETAILED DESCRIPTION

Figure 1A:
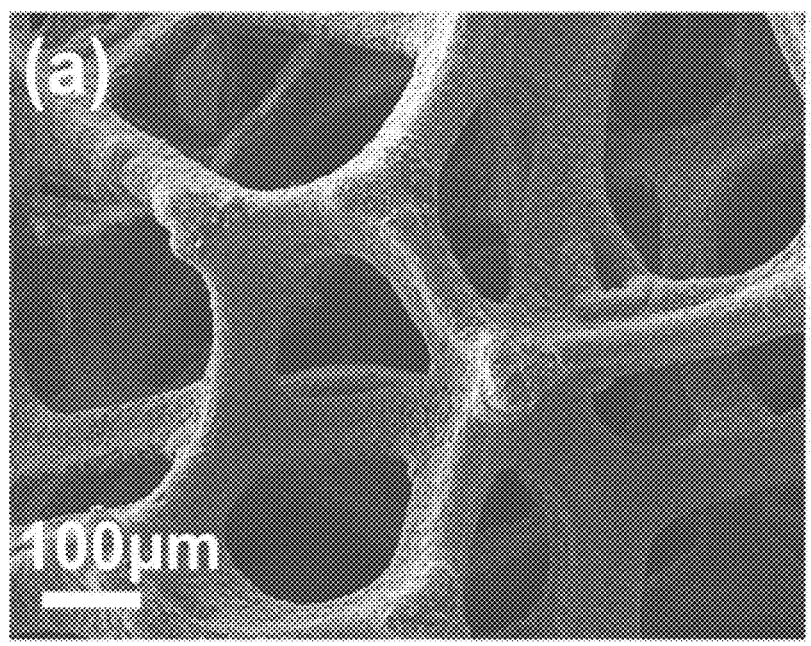
FIGS. 1A and 1B show Scanning Electron Microscopy (SEM) images of the present VACNTs at different magnifications.

The following detailed description refers to the accompanying drawings that show, by way of illustration, specific details and aspects in which the present disclosure may be practiced. These aspects are described in sufficient detail to enable those skilled in the art to practice the present disclosure. Various aspects are provided for devices, and various aspects are provided for methods. It will be understood that the basic properties of the devices also hold for the methods and vice versa. Other aspects may be utilized and structural, and logical changes may be made without departing from the scope of the present disclosure. The various aspects are not necessarily mutually exclusive, as some aspects can be combined with one or more other aspects to form new aspects.

The present disclosure generally relates to rechargeable energy storage devices, including aqueous metal-air cells, alkaline fuel cells, and other batteries. There are numerous applications for metal-air cells and alkaline fuel cell technology, such as for electric vehicles, energy supply for remote locations, energy supply for maritime uses and stationary energy storage, as well as emergency power and disaster relief applications.

According to the present aspects of this disclosure, iron (Fe) and cobalt (Co) composites are among the more promising types of catalysts for the future generation of fuel cells and metal-air cells. The Fe and Co— nitrogen (N), coordination-based centers supported by phosphorus (P) doped carbon nanotubes (CNT) and the polyaniline-phytic acid-derived mesoporous carbon material (i.e., FeCo—NPCNTs) have a high catalytic activity that is comparable with platinum-carbon (Pt/C) but at a much lower cost than Pt/C. The present FeCo—NPCNTs are morphology-dependent catalysts that provide effective performance for bifunctional oxygen reduction reaction (ORR) and oxygen evolution reaction (OER) in metal-air cells and fuel cells. Specifically, the ORR at the cathode of the fuel cells and metal-air cells will determine the overall system performance.

The present CNTs, which consist of multiple rolled layers of sp2-hybridized carbon atoms with cylindrical nanostructure along one direction, are useful as catalyst supports due to their one-dimensional structure that enhances electron and reactant transport. The carbonization of precursor materials containing Fe, Co, or Ni may achieve a high degree of graphitization below 1000° C. Graphitic carbon is resistive to the corrosive effect of electrolytes, and therefore, the combination and confinement of the active metal-N—C centers onto corrosion resistive graphitic carbon may prohibit their aggregation and achieve the maximum atom-utilization efficiency with highly desirable long durations.

A mesoporous material is a material containing pores with diameters between 2 and 50 nm, according to IUPAC nomenclature. For comparison, IUPAC defines microporous material as a material having pores smaller than 2 nm in diameter and macroporous material as a material having pores larger than 50 nm in diameter.

In the various aspects of the present disclosure, the FeCo—NPCNT catalysts have subnanometer or atomic-scale catalytic centers that are principally confined at the edge and/or between the graphitic interlayers of N and P doped CNTs and have favorable pore structures to maximize their reaction volumes as catalysts. The electrochemical measurements show that the mesoporous N and P co-doped CNTs and the Fe and Co bimetallic centers are crucial to the good performance of FeCo—NPCNTs. The FeCo—NPCNTs show comparable performance to Pt/C in rotating disk testing. It also shows significantly higher activity and stability than commercial catalyst materials when tested in assembled Zn-air cells.

These and other advantages and features of the aspects herein disclosed will be apparent through reference to the following description and the accompanying drawings. Furthermore, it is to be understood that the features of the various aspects described herein are not mutually exclusive and can exist in various combinations and permutations. For the sake of brevity, duplicate descriptions of features and properties may be omitted.

Figure 1B:
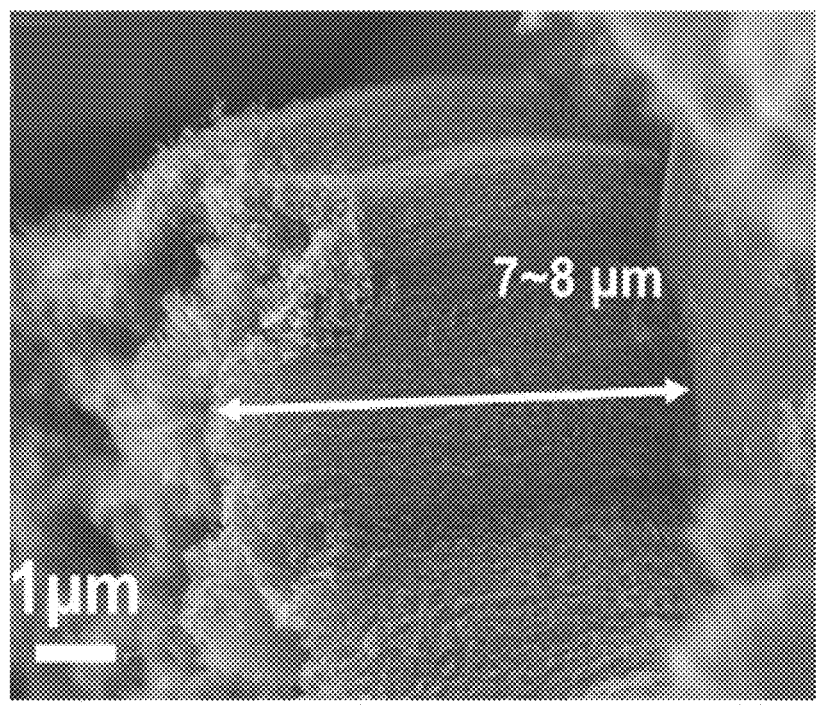
Figure 1C:
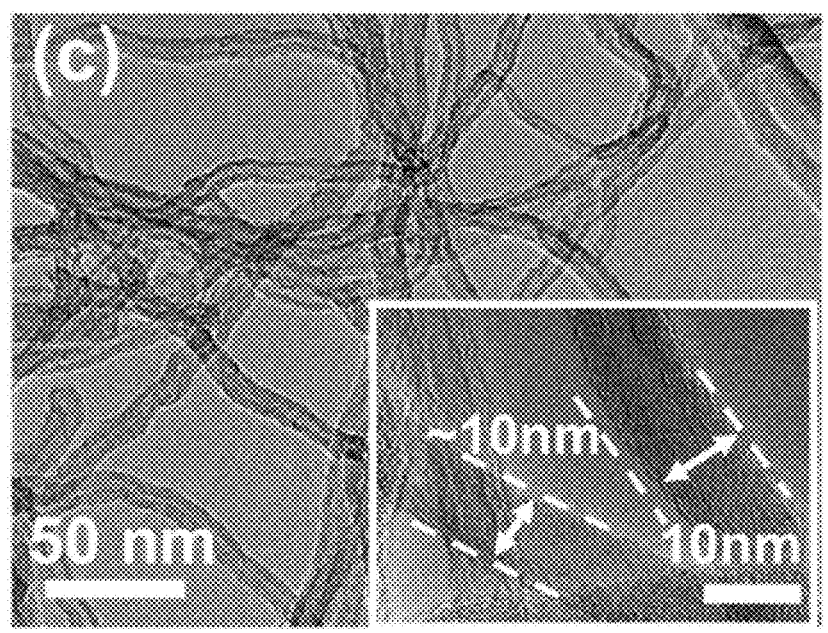
FIG. 1C shows a Transmission Electron Microscopy (TEM) image of similar VACNTs according to aspects of the present disclosure.

FIGS. 1A and 1B show Scanning Electron Microscopy (SEM) images of the present VACNTs at different magnifications. The SEM images of VACNTs show the presence of micrometer-sized macropores and vertically aligned/axial features of VACNT layers with thicknesses of approximately 7-8 μm. The TEM image in FIG. 1 C shows similar VACNTs, according to an aspect of the present disclosure, having diameters of approximately 10 nm and 5 to 10 layers of walls and have relatively smooth surfaces and good crystallinity. The good crystallinity of the CNTs ensures they have better conductivity and resistance to acid and alkaline than amorphous carbon materials.

Figure 2:
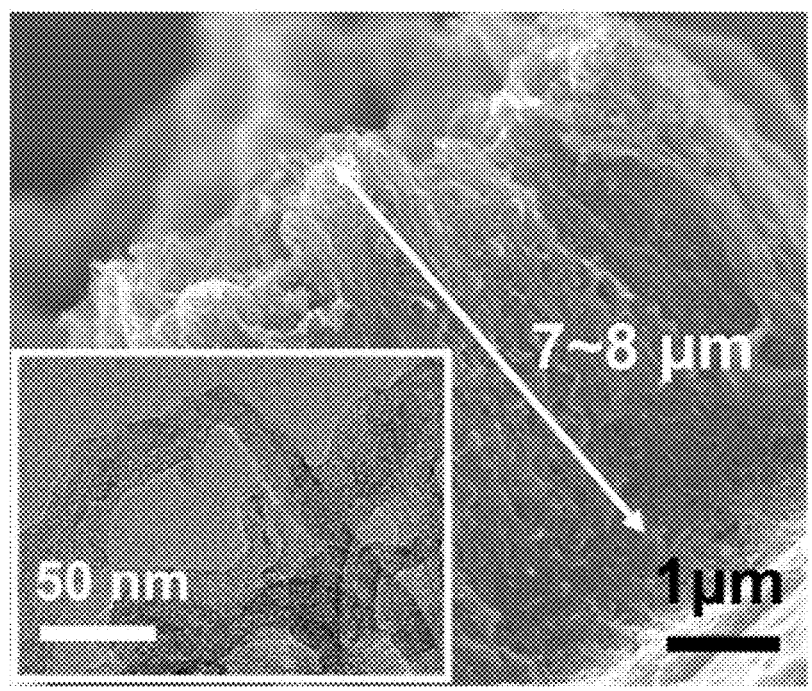
FIG. 2 shows SEM and TEM images of FeCo—NPCNTs according to an aspect of the present disclosure.
Figure 3A:
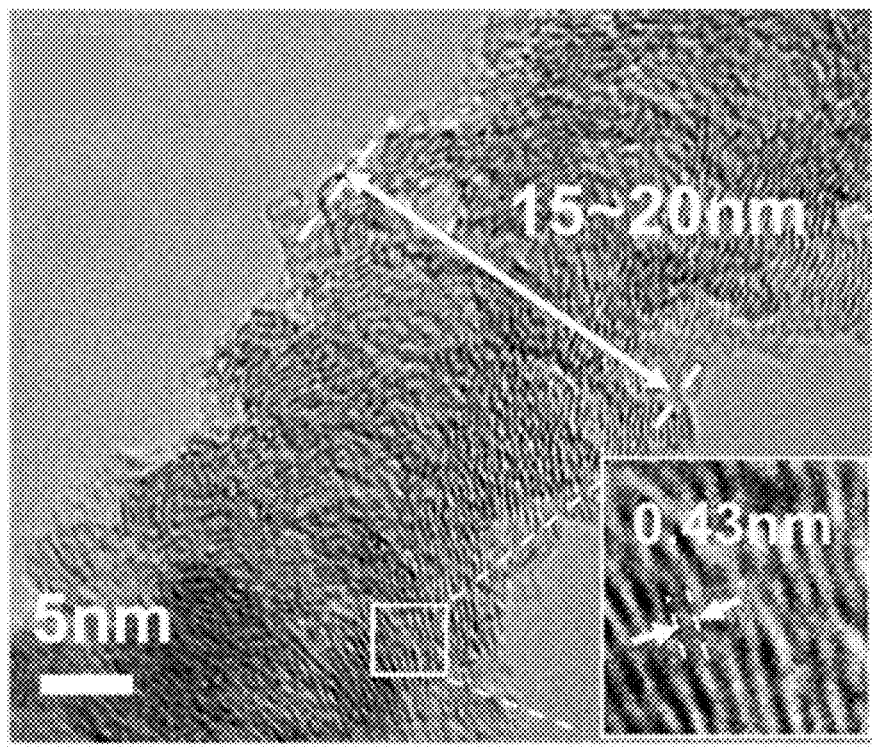
FIGS. 3A and 3B show High-Resolution Transmission Electron Microscopy (HRTEM) images of FeCo—NPCNTs according to aspects of the present disclosure.
Figure 3B:
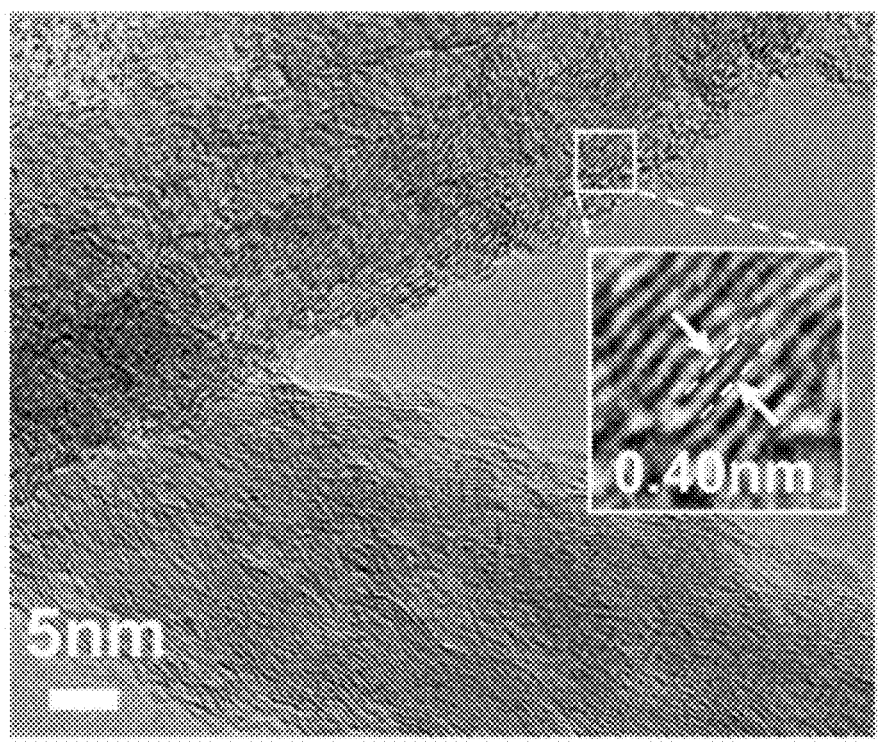

In FIG. 2, an SEM image of FeCo—NPCNTs shows vertically aligned morphology may be maintained for FeCo—NPCNTs and the individual CNTs may have an increased tube diameter to approximately 15-20 nm. The vertically aligned CNTs can produce 1D pores that facilitate fast air and electrolyte diffusion In the aspects in FIGS. 3A and 3B, according to the present disclosure, HRTEM and HADDF-STEM images of the FeCo—NPCNTs show that the interlayer distance between the graphite layers may be seen to increase from 0.335 nm to 0.4 nm or more (i.e., 0.4 nm and 0.43 nm, respectively). The graphitic layers of rough surface created by the doping process may not be aligned along the axis direction of CNTs with a large number of edges exposed on the surface of CNTs.

Figure 4:
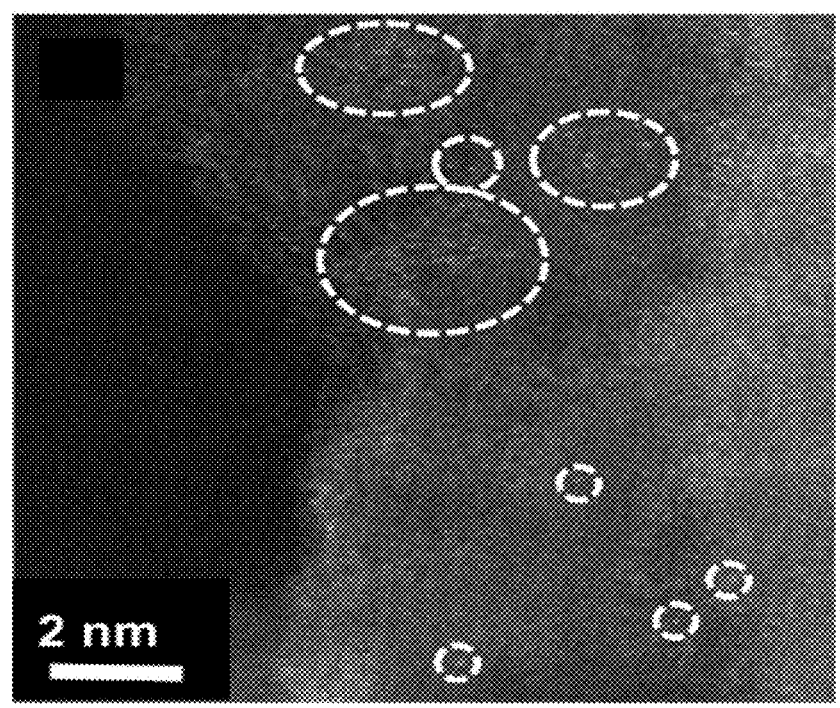
FIG. 4 shows a High-Angle Annular Dark-Field Scanning Transmission Electron Microscopy (HAADF-STEM) image of FeCo—NPCNTs according to an aspect of the present disclosure.

As shown in FIG. 4, while the individual metallic catalyst nanoparticles were not observable from the TEM images, the aberration-corrected HAADF-STEM shows uniform distribution of bright dots in the CNTs that support the existence of Fe and Co single atom or clusters. The graphitization of carbon catalyzed by these transition metals may lead to the reconstruction or change of the graphitic layer orientation according to the present disclosure, which may provide more exposed active edge sites.

Figure 5:
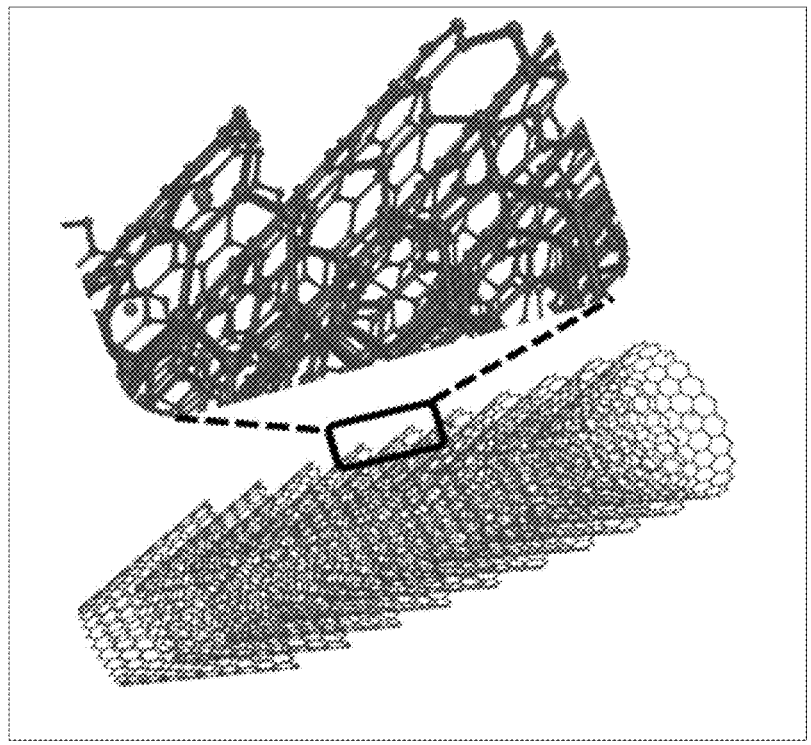
FIG. 5 shows an illustrative representation of the location of the Fe and Co atoms in FeCo—NPCNTs according to an aspect of the present disclosure.

In FIG. 5, an illustrative representation of carbon nanotubes, as straight and/or spirally shaped, and the location of the Fe and Co atoms in FeCo—NPCNTs according to an aspect of the present disclosure. The sub-nanometer or atomic-scale catalysts centers can be identified from the HAADF-STEM as being generally confined at the edge and/or between the interlayer of graphene. In an aspect, the present catalysts may be prevented from aggregating during the annealing process and thereby providing the maximum atom-utilization efficiency (i.e., activity per unit mass).

Zinc-air cells work like conventional batteries in that they generate electrical power from chemical reactions. But instead of packing the necessary ingredients inside the cell, zinc-air batteries get one of their main reactants-oxygen-from the outside air. Oxygen molecules enter the cell through tiny holes in the top and then come into contact with a catalytically active electrode (cathode) made of porous carbon, catalysts, and other additives. Electrolytes present in the pores of the electrode react with the oxygen to produce OH⁻, which will migrate through a separator to an anode that consists of a zinc plating or powder. The OH⁻ ions bond to the zinc metal to form zincate, which immediately splits into two hydroxyls, a water molecule, and zinc oxide, and releases two electrons that travel through a circuit to power a device.

Figure 6:
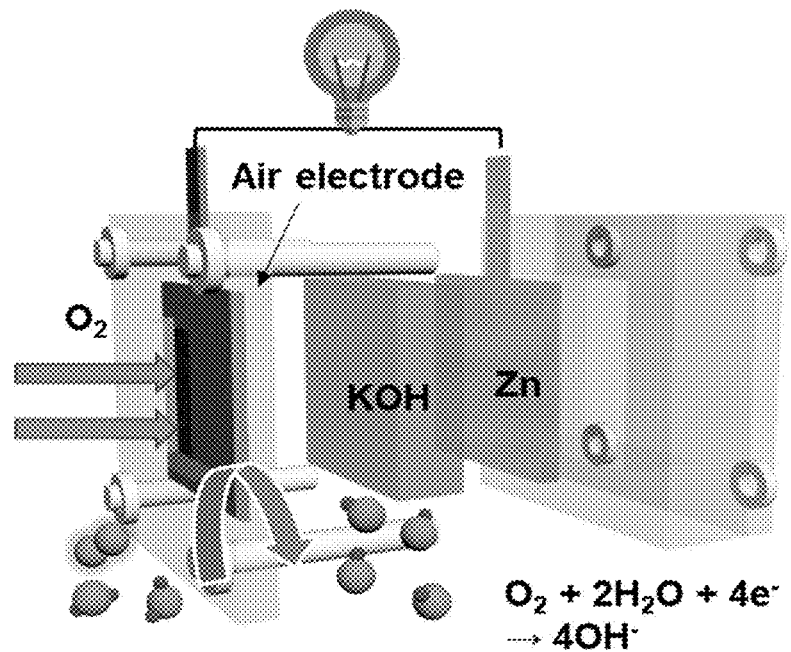
FIG. 6 shows an illustrative representation of a zinc-air battery/cell (ZAB) according to an aspect of the present disclosure.

FIG. 6 shows an illustrative representation of a zinc-air battery/cell (ZAB) according to an aspect of the present disclosure. The ZAB glass cell was assembled to evaluate/test the performance of samples of the present catalysts under different conditions. For example, a FeCo—NPCNTs-9 sample was used as a free-standing electrode, while a Pt/C reference sample was made by spraying the catalyst onto commercial carbon paper.

Figure 7:
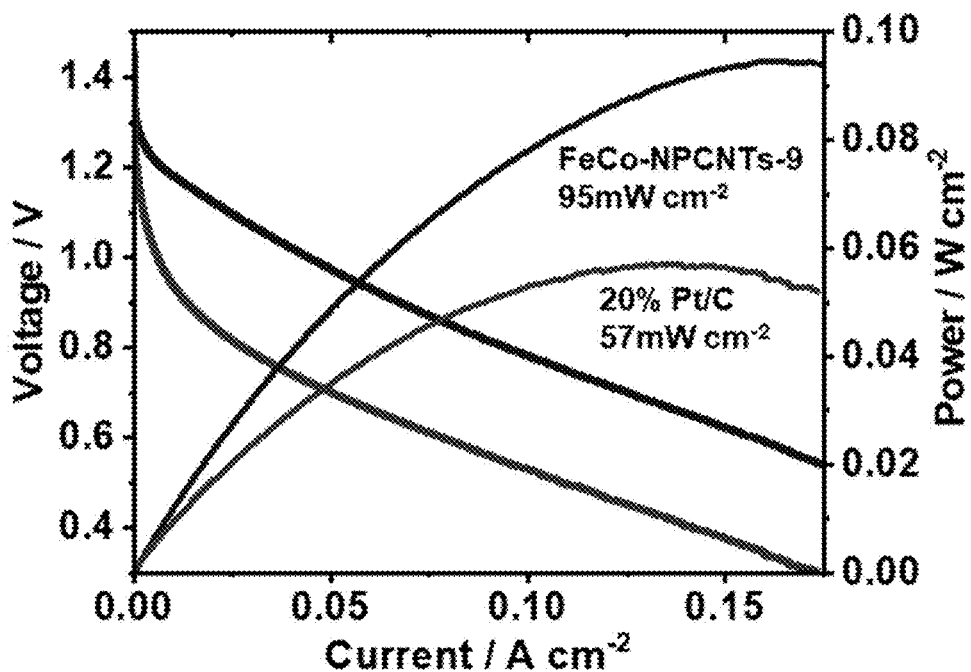
FIG. 7 shows polarization curves of primary ZABs assembled with FeCo—NPCNTs and commercial Pt/C as catalysts according to an additional aspect of the present disclosure.

In FIG. 7, the polarization curves of Zn-air cells assembled with FeCo—NPCNTs and commercial Pt/C as catalysts are shown. For example, a lab Zn-air battery (ZAB) cell was assembled to evaluate the performance of the present FeCo—NPCNT catalyst in actual working conditions. When used as the air-electrode in a two-electrode configuration, the FeCo—NPCNTs-9 exhibited a high peak power density of approximately 95 mW cm², which was much higher than the reference Pt/C catalyst on graphene foam (GF), which only possesses a peak power density of 57 mW cm².

Figure 8:
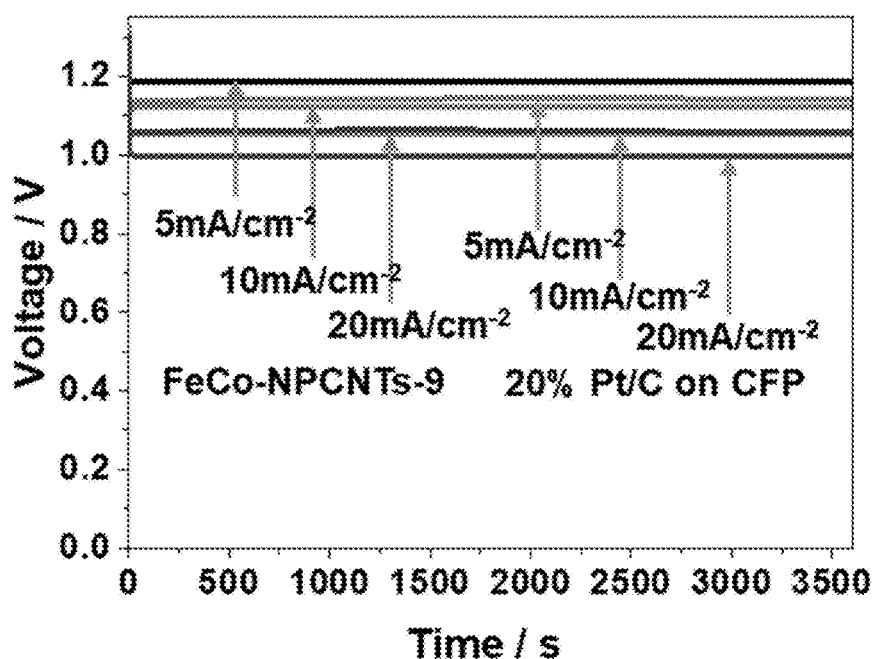
FIG. 8 shows the constant current discharge results of primary ZABs assembled with FeCo—NPCNTs and commercial Pt/C as catalysts according to an aspect of the present disclosure.

FIG. 8 shows the constant current discharge results using a primary ZAB assembled with FeCo—NPCNTs and commercial Pt/C as catalysts according to an aspect of the present disclosure. For example, all of the ZAB cells produced discharge voltages at the current densities of approximately 5 mA cm², 10 mA cm², and 20 mA cm², which were plotted against discharge time. The discharge voltages were stable for over one hour under different discharge currents. The discharge voltages for FeCo—NPCNTs-9 were more than 200 mV higher than that of the cells with Pt/C air cathode under all current densities tested, which is a measure of good catalytic activity for the present FeCo—NPCNTs-9 and realizing high power density Zn-air cells. The good performance of the VACNT-GF based samples may be attributed to the hierarchical porous structure of the electrodes, which provides plenty of surface area for the formation of tri-phase interfaces and allows for gas diffusion into the electrode, combined with the good electrical conductivity of the sample. From these factors, the present cells can achieve a significantly higher power output than commercial cells.

Figure 9:
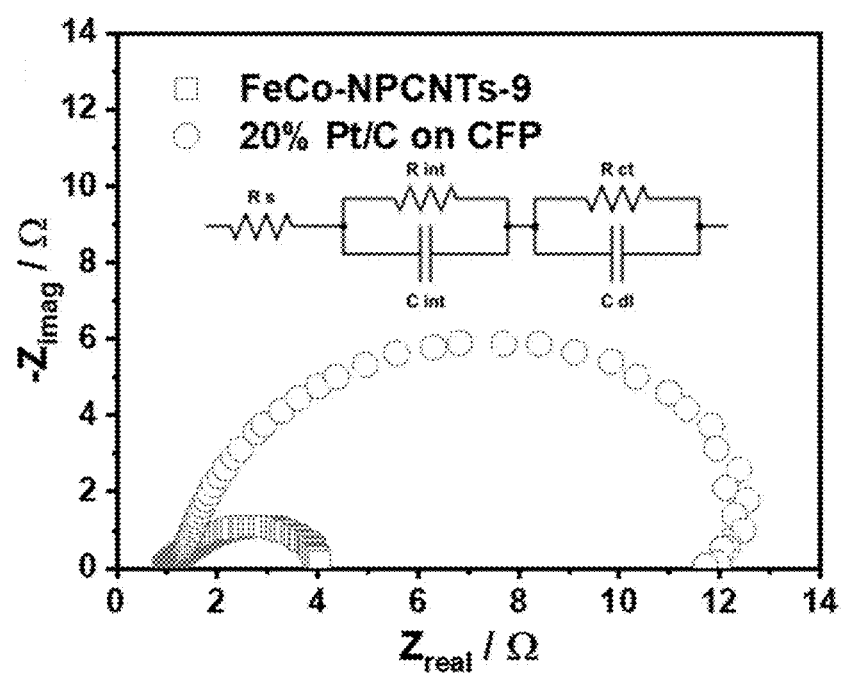
FIG. 9 shows Electrochemical Impedance Spectroscopy (EIS) measurement results of primary ZABs assembled with FeCo—NPCNTs and commercial Pt/C as catalysts according to an aspect of the present disclosure.

In FIG. 9, the results of Electrochemical Impedance Spectroscopy (EIS) measurements for primary ZAB cells assembled with FeCo—NPCNTs and commercial Pt/C as catalysts are shown, according to an aspect of the present disclosure, to evaluate the electrical properties and reaction kinetics of the present catalysts. The EIS measurements for the cells with FeCo—NPCNTs-9 samples and Pt/C catalyst on commercial graphdiyne foam (GDF), as the air cathodes, were performed at an operation condition of 0.4V lower than the open-circuit voltage and the Nyquist plot, as shown in FIG. 9. The data was fitted to an equivalent circuit, as shown as an overlay in FIG. 9, namely external resistance (Re), internal ohmic resistance arising from the electrolyte, electrocatalyst and contact resistances (RI) kinetic resistance from the ORR process (Rk), mass transfer impedance (Rm), two capacitive elements that arise from supercapacitor-type behavior of porous samples (Can and Cm), and the capacitive part of the mass transfer impedance (Cm), as shown in Table 1 below.

In Table 1, the FeCo—NPCNTs-9 samples show slightly lower Ri, which may be due to its integrated structure resulting in better conductivity in the electrodes. The same Rk agrees with the similar catalytic activity of these two catalysts and the significantly lower Rm value of FeCo—NPCNTs-9 samples show the superior structure of the FeCo—NPCNTs-9 samples in terms of mass transfer. The higher double-layer capacitive elements ($C_{d1}$ and $C_{d2}$) show an increased tri-phase interface area of the cell with FeCo—NPCNTs-9 samples.

TABLE 1

| | EIS Fitted results | | |
|---|---|---|---|
| Component | | Pt/C on GF | FeCo-NPCNTs-9 |
| Re | External ohmic resistance/Ω | 1.03 | 0.96 |
| $R_i$ | Internal ohmic resistance/Ω | 0.92 | 0.89 |
| $R_k$ | Kinetic resistance/Ω | 1.67 | 1.67 |
| $R_m$ | Mass transfer impedance/Ω | 4.95 | 0.67 |
| $C_{d1}$ | Double-layer capacitance/F | $1.16 \times 10^{-3}$ | $1.86 \times 10^{-3}$ |
| $C_{d2}$ | Double-layer capacitance/F | $3.22 \times 10^{-4}$ | $1.90 \times 10^{-4}$ |
| $C_m$ | Mass transfer impedance/F | $2.27 \times 10^{-5}$ | $2.01 \times 10^{-4}$ |

Figure 10:
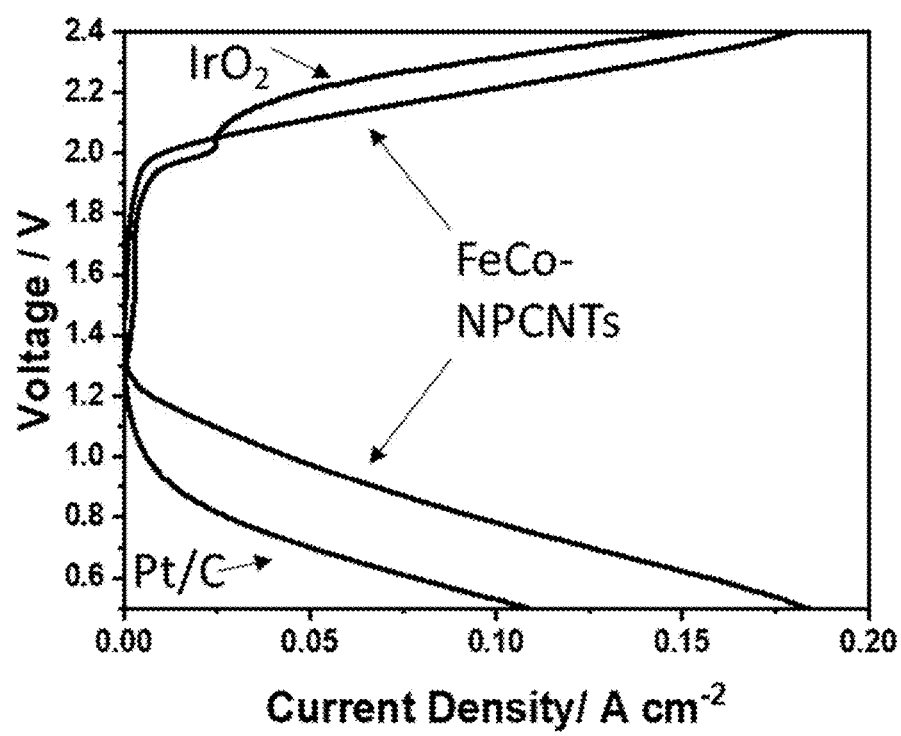
FIG. 10 shows polarization curves of rechargeable Zn-air cells assembled with FeCo—NPCNTs and commercial Pt/C and iridium dioxide (IrO$_2$) as catalysts according to a further aspect of the present disclosure.

In a further aspect, FIG. 10 shows polarization curves of the rechargeable ZAB assembled with FeCo—NPCNTs and commercial Pt/C and IrO₂ as catalysts, according to the present disclosure. As shown in the polarization curves, the FeCo—NPCNTs may also be catalytically active for OER, which makes them suitable for rechargeable ZABs. The polarization curves for the ZAB with FeCo—NPCNTs, as both the ORR and OER electrodes, were performed under ambient conditions. The FeCo—NPCNTs initially show similar current densities as IrO₂ on carbon paper as the OER electrode and Pt/C on GF as the ORR electrode. However, after a few cycling, the FeCo—NPCNTs begin to significantly outperform IrO₂ carbon paper and Pt/C on GF catalysts.

Figure 11A:
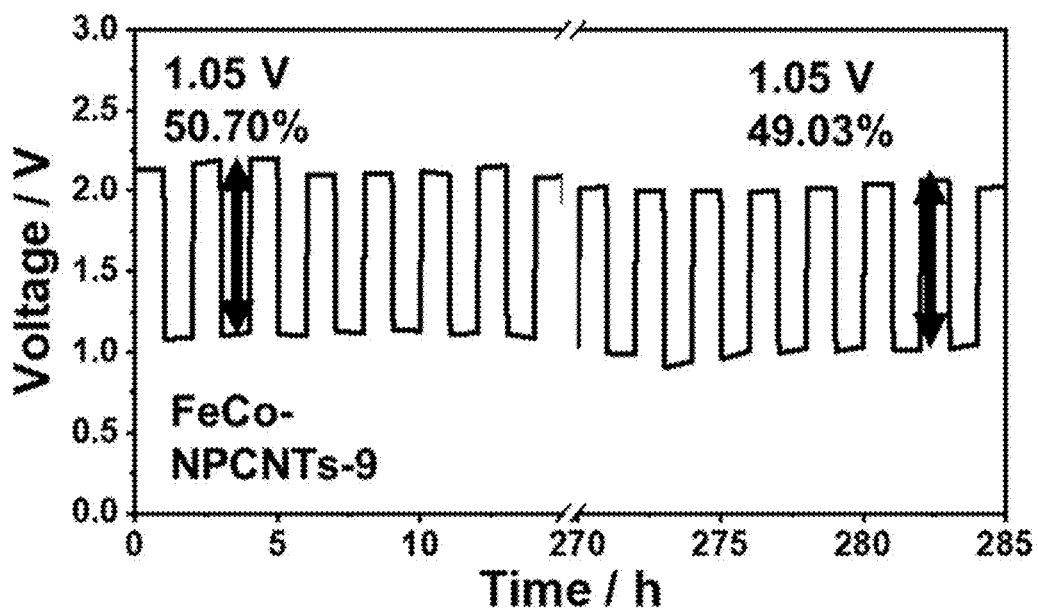
FIGS. 11A through 11D show representative cycle-life of rechargeable Zn-air cells assembled with FeCo—NPCNTs and commercial Pt/C and IrO$_2$ as catalysts according to other aspects of the present disclosure.
Figure 11B:
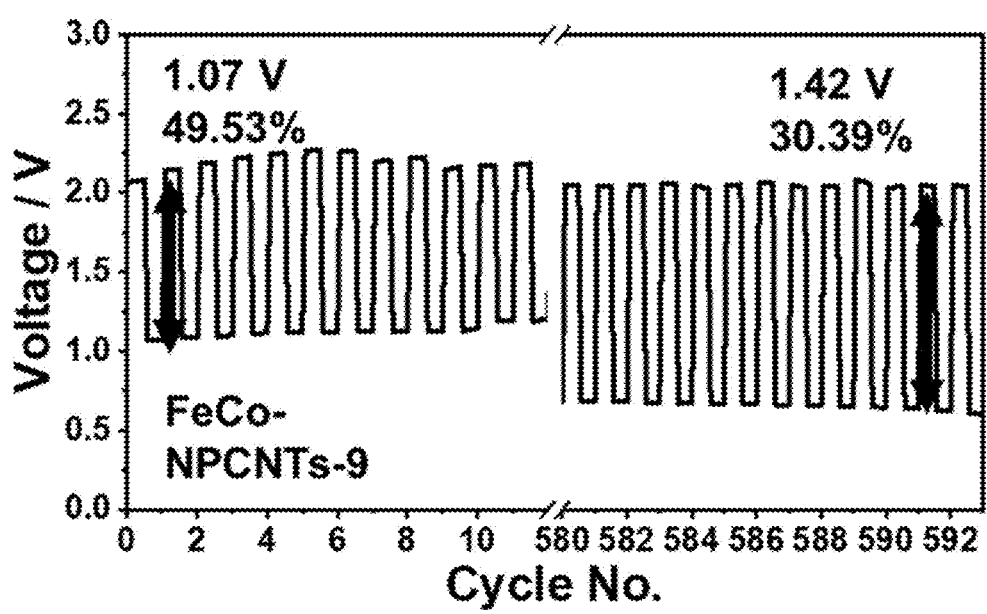
Figure 11C:
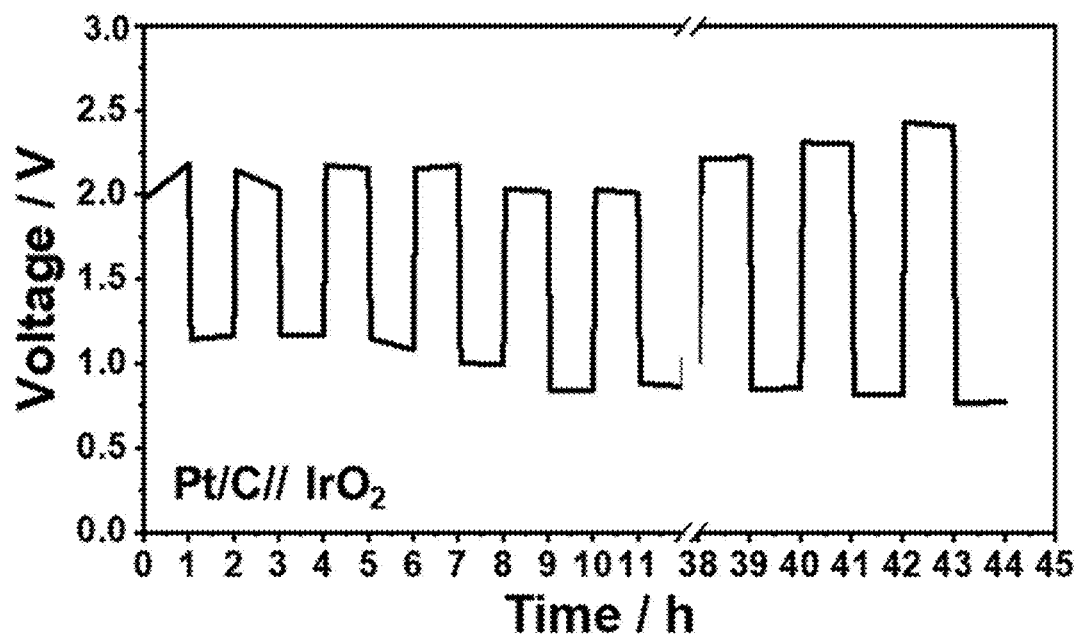
Figure 11D:
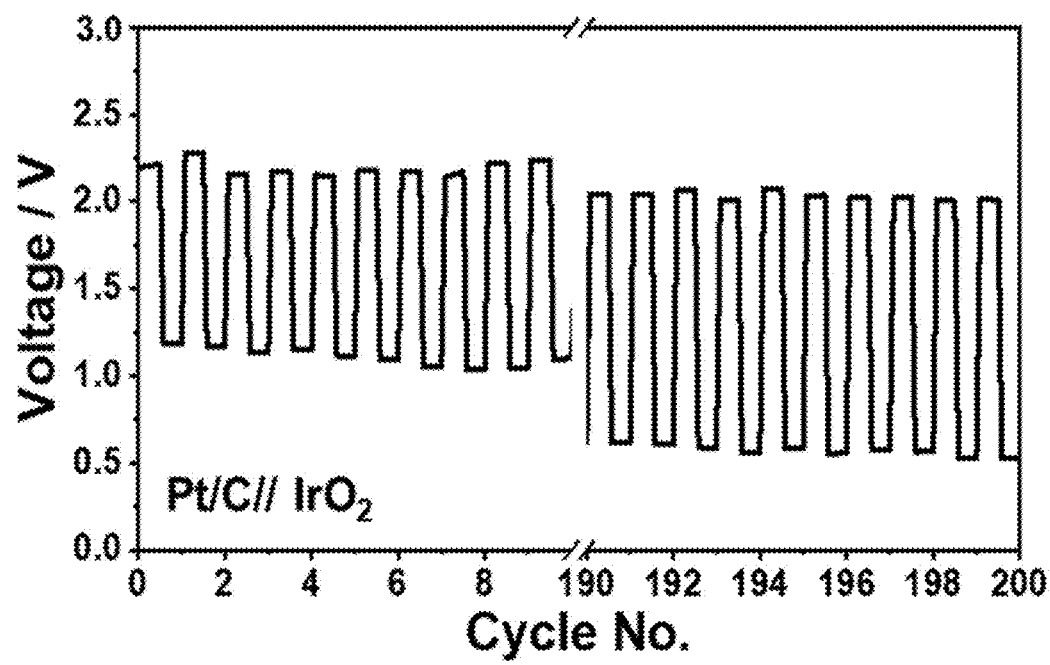

FIGS. 11A through 11D show representative cycle-life of rechargeable Zn-air cells assembled with FeCo—NPCNTs and commercial Pt/C and IrO₂ as catalysts according to a further aspect of the present disclosure. The rechargeable ZAB can achieve a stable operation of over 285 hours using a 3-electrode setup and pulse charge-discharge under a low current density of 2 mA/cm², 2 hours per cycle, and over 590 cycles under a high current density of 5 mA/cm², 20 min per cycle. As shown in FIG. 11A, under the current density of 2 mA/cm², the charge-discharge voltage gap remains roughly unchanged after 285 hours, while the round-trip efficiency only decreased from 50.70% to 49.03% V. As shown in FIG. 11B, under the higher current density of 10 mA/cm², the gap increased from 1.07 V to 1.42 V after 590 cycles of operation. By plotting the charge-discharge curves of FeCo—NPCNTs-9 cells together, the Pt/C//IrO₂ cells had significantly shorter operation time and a significant increase in the voltage gap only after 45 hours and 200 cycles under low and high current densities, respectively, as shown in FIGS. 11C and 11D.

Figure 12A:
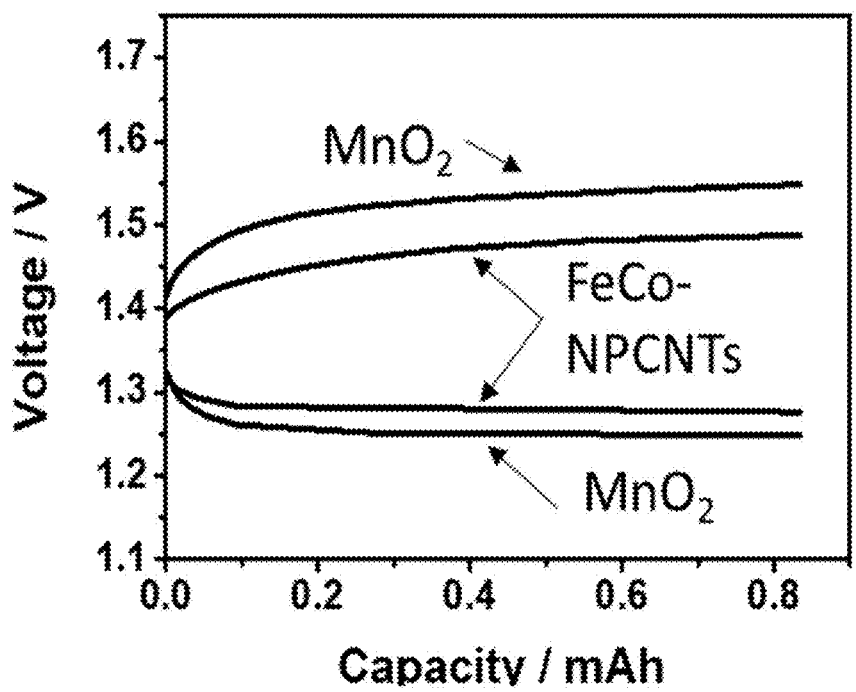
FIGS. 12A and 12B show charge-discharge curves for the first cycle and 50$^{th}$ cycle, respectively, for a FeCo—NPCNTs batch and a MnO$_2$ reference batch according to further aspects of the present disclosure.
Figure 12B:
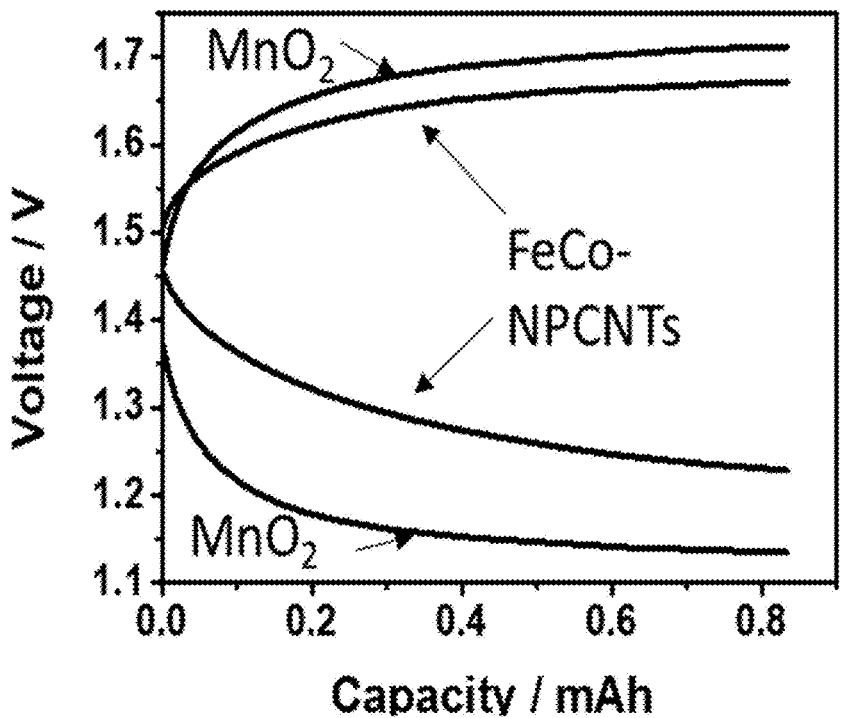

FIGS. 12A and 12B show charge-discharge curves of the first cycle and 50$^{th}$ cycle, respectively, for FeCo—NPCNT samples and a MnO₂ reference catalyst, according to a further aspect of the present disclosure. In FIG. 12A, with a 2-electrode cell system with activated MnO₂ as the reference, it can be seen that the FeCo—NPCNTs samples have a discharge voltage platform of 1.28 V on the first cycle with a high current density of 5 mA/cm², 2 hours per cycle while the reference at only has 1.25 V.

In FIG. 12B, after 50 cycles, the discharge platforms decreased to 1.15 V for MnO₂ but remains at ~1.25 V for FeCo—NPCNTs. The charging potential was 1.46V for FeCo—NPCNTs and 1.5V for MnO$_2$ at the first cycle and 1.65 V for FeCo—NPCNTs and 1.68V for MnO$_2$ after 50 cycles. Overall, the FeCo—NPCNTs have superior performance than MnO$_2$, both before and after cycling, and greatly outperforming MnO$_2$ in oxygen reduction after long-term cycling, which is widely regarded as the weak point in terms of cyclability of OER//ORR bi-functional catalysts.

As shown in Table 2 below, the consistency of the present catalyst was tested by comparing the onset potential using the RDE results for six batches of the FeCo—NPCNT catalyst:

TABLE 2

| Batch No. | Onset potential (vs. Ag/AgCl) |
|---|---|
| 1 | −0.103 |
| 2 | −0.137 |
| 3 | −0.114 |
| 4 | −0.101 |
| 5 | −0.137 |
| 6 | −0.083 |
| Std. Dev. | 0.021 |
| Average | −0.113 |

The RDE results show that the different batches of FeCo—NPCNT catalysts, being morphology-dependent, had properties that are essentially the same.

In the method of making the catalysts, according to the present disclosure, the FeCo—NPCNTs catalyst can be synthesized either using powder CNTs or CNTs arrays on a substrate. The CNTs are straight or spirally shaped having, for example, average diameters in the range of about 10 to 20 nm, with an average wall thickness of 5-10 nm, and is mesoporous with a layer thickness of 7-8 μm. This structure's performance is created by a rough surface on CNTs with the self-assembling during the polymerization of phytic acid and aniline. The polyaniline doped with phytic acid is coated on CNTs using a wet chemistry method by mixing phytic acid and aniline the slowly adding in an oxidizing agent with stirring. The polyaniline can be replaced with polyvinyl alcohol and a nitrogen source (e.g., melamine or ammonia). The polyaniline and phytic acid roughen the surfaces of the CNTs for better deposition of Fe and Co.

Figure 13:
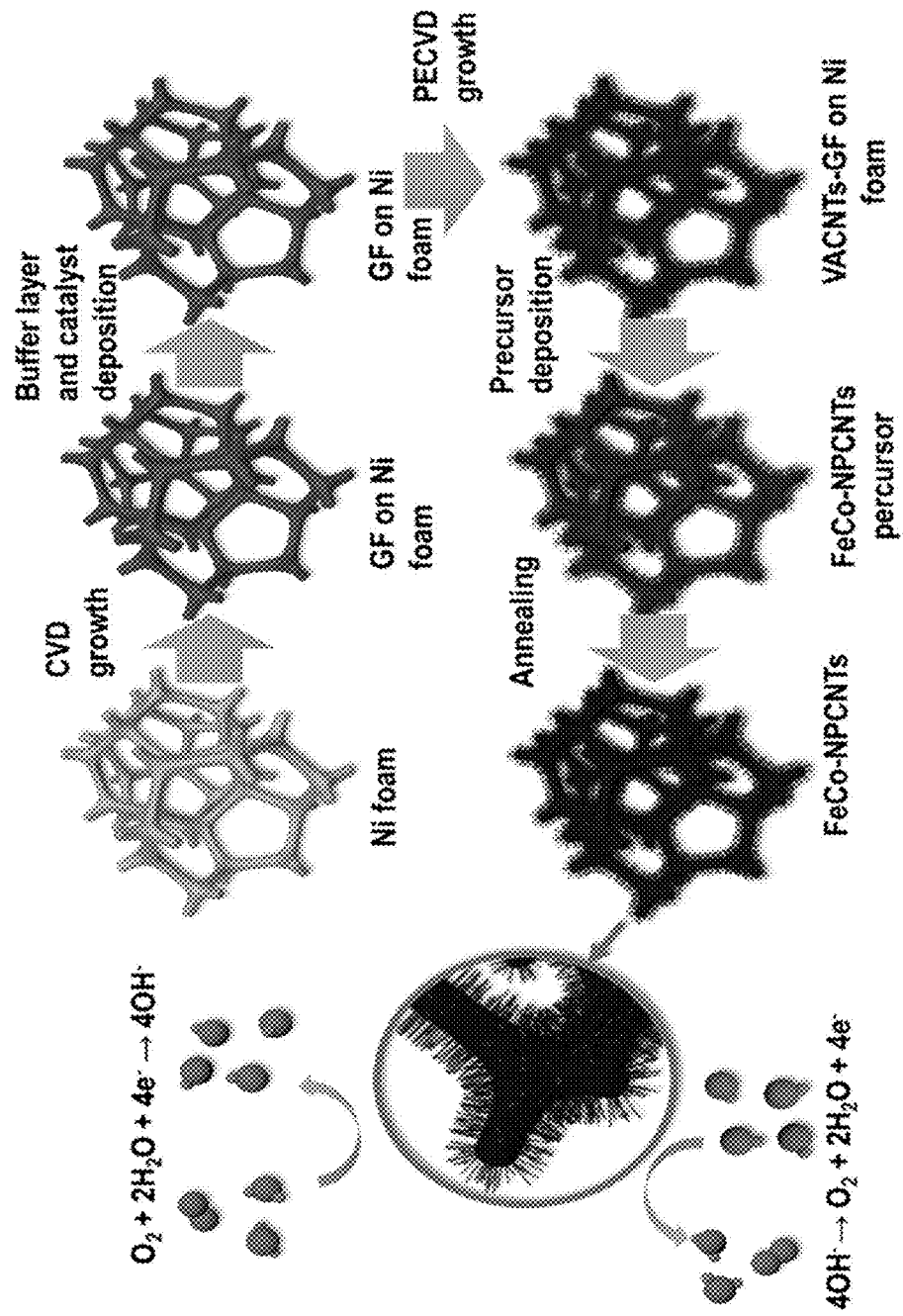
FIG. 13 shows an exemplary synthesis procedure for forming free-standing FeCo—NPCNTs according to an aspect of the present disclosure.

As shown in FIG. 13, an exemplary synthesis procedure for forming free-standing FeCo—NPCNTs may include GF grown on a Ni foam template by a chemical vapor deposition (CVD) method for use as a substrate. An aluminum oxide (Al$_2$O$_3$) buffer layer was then coated on the GF using the atomic layer deposition (ALD) method may be followed by spray coating of a mixture of Fe and Co salts and further rapidly pyrolyzed. The GF may be placed in a plasma-enhanced CVD (PECVD) system for growing vertically aligned carbon nanotubes (VACNTs). After etching away the Ni template, polyaniline doped with phytic acid may be deposited on VACNTs using a wet chemistry method and dipped in a Fe and Co precursor solution (i.e., an Fe and Co salt solution) and dried for further annealing. Finally, the FeCo—NPCNTs may be annealed at various temperatures, including temperatures ranging from 700 to 1000 degrees C. and followed by acid beaching to remove inert metals (e.g., iron oxides and cobalt oxides). In an aspect of the present disclosure, the FeCo—NPCNTs batches annealed at 900° C. show the best catalytic activity.

According to the present disclosure, the N and P co-doping and co-existence of Fe and Co atoms are crucial to the good performance of the FeCo—NPCNT catalyst. The presence of N and P ensures smaller size growth of the Fe and Co centers on the NPCNTs. In addition to Fe and Co, Ni and Mn can also be used, as well as mixtures thereof.

Figure 14A:
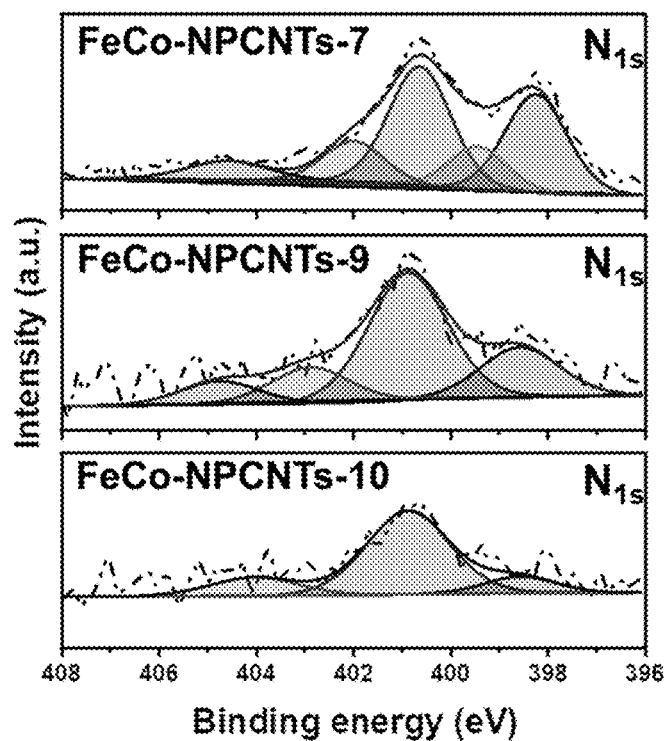
FIGS. 14A and 14B show X-ray photoelectron spectroscopy (XPS) narrow scan of Nis and P$_{2P}$ spectra, respectively, for FeCo—NPCNTs annealed at temperatures of 700, 900, and 1000° C. according to aspects of the present disclosure.
Figure 14B:
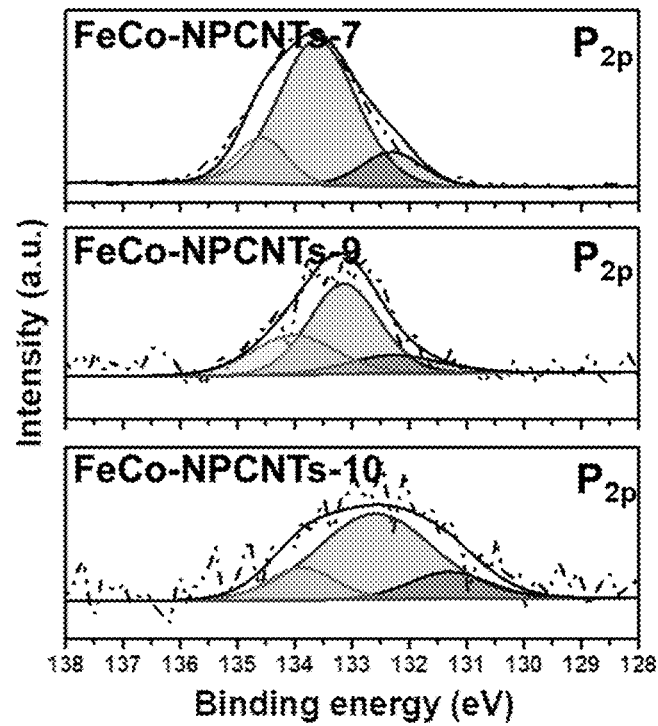

FIGS. 14A and 14B show X-ray photoelectron spectroscopy (XPS) narrow scan of Nis and P$_{2P}$ spectra, respectively, for the present FeCo—NPCNTs. The XPS measurements were conducted for samples annealed at different temperatures, including at 700, 900, and 1000° C. The Nis spectra for FeCo—NPCNTs annealed at temperatures of 700, 900, and 1000° C. show peaks corresponding to pyridinic N at 398 eV, pyrrolic N at 399 eV, graphitic N at 401 eV, and oxidized N (>402 eV). It may be observed from the spectra that pyrrolic N exists only in the sample annealed at 700° C. With an increase of temperature from 700 to 1000° C., there was a gradual diminishing of the pyrrolic N peak intensity and an increase of pyridinic N peak. The N near the edge sites, especially the pyridinic N, is an important factor in the ORR activity of N-doped carbon materials, according to the present disclosure. In addition, the P$_{2p}$ spectra for FeCo—NPCNTs samples contained major peaks at approximately 131.1 and 132.5 eV correspond to C—P bonds and a peak at 134.2 eV caused by POx groups. The peaks may display a blue shift indicating an increased electron density around the P atoms.

Figure 15A:
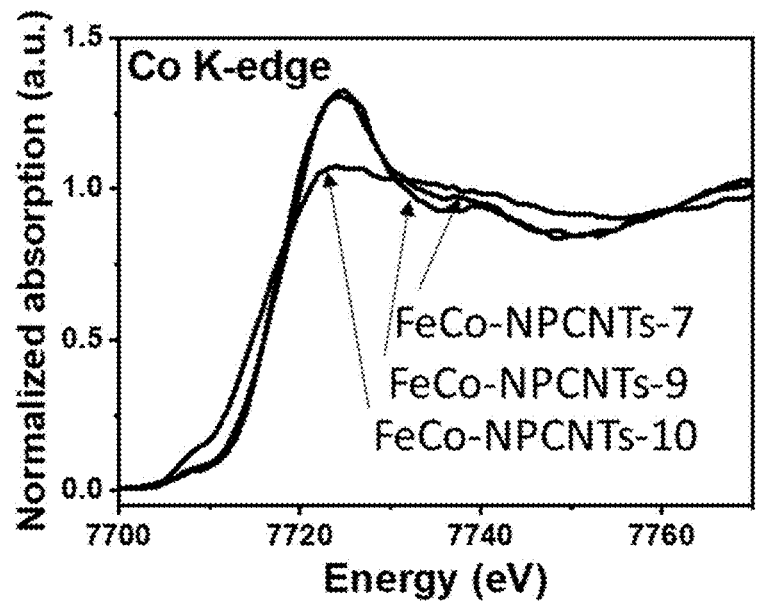
FIGS. 15A and 15B show narrow scan X-ray Absorption Near Edge Structure (XANES) spectra for FeCo—NPCNTs annealed at temperatures of 700, 900, and 1000° C. according to an aspect of the present disclosure.
Figure 15B:
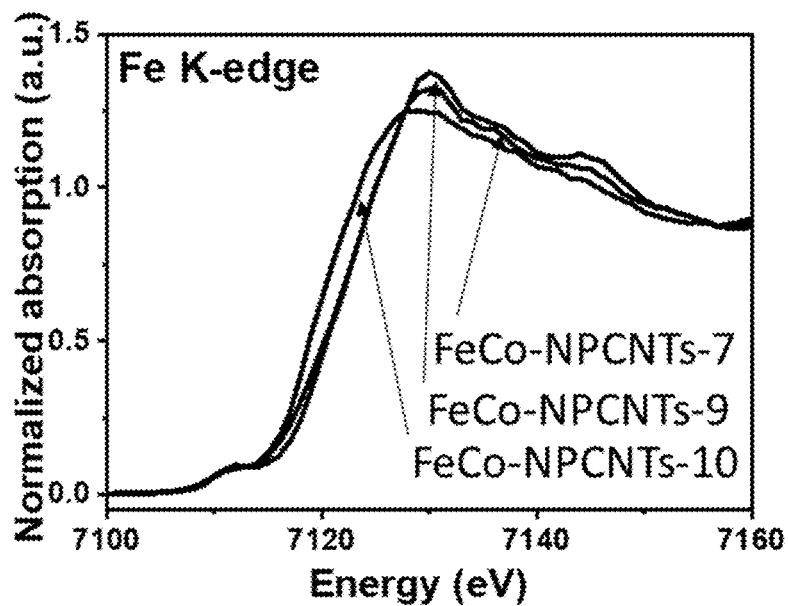

In FIGS. 15A and 15B, according to the present disclosure, narrow scan X-ray Absorption Near Edge Structure (XANES) spectroscopy was used to better identify the site structure on the FeCo—NPCNTs; in particular, the atomic arrangement around the Fe and Co atom containing centers. The XANES spectra of Co K-edge, as shown in FIG. 16A, has an edge measurement of approximately 7725 eV, which corresponds to a 1s to 4p electronic transition of Co. The existence of "pre-edge" features may be from the presence of some Co metal in the sample treated at 1000° C., while the samples treated at 700 and 900° C. show spectra that correlate to known Co containing active centers, such as Co(II) phenanthroline, Co—P—NC structures, and cobalt phosphide. The absorption edge at 7130 eV may be attributed to 1s to 4p electronic transition of iron metal.

As shown in FIG. 15B, the spectra correlate with that of known FeNC structures with a strong feature at approximately 7118 eV, which is a fingerprint for Fe$_2$+ square planar complexes, such as iron (II) phthalocyanine. The lack of a strong pre-edge peak around 7110-7118 eV, which is characteristic of iron(II) phthalocyanine may indicate a broken D$_{4h}$ symmetry with Fe-containing structures other than iron (II) phthalocyanine, such as FeN$_4$C$_{10}$ active sites in the carbon basal plane or of FeN4C8 active sites in armchair edges of graphitic carbon (e.g., FeN$_{2+2}$ centers).

According to an aspect of the present disclosure, pyridinic or pyrrolic-N atoms form metal-N-coordinated moieties and stabilize the catalytic active center; especially for the space-confined M-N—C moieties in-between the adjacent layers of graphene provided by the uniform distribution of pyridinic N. In particular, the charge redistribution caused by N doping may render the C atom adjacent to the N atom to be positively charged, thus acting as the active site for ORR.

Figure 16:
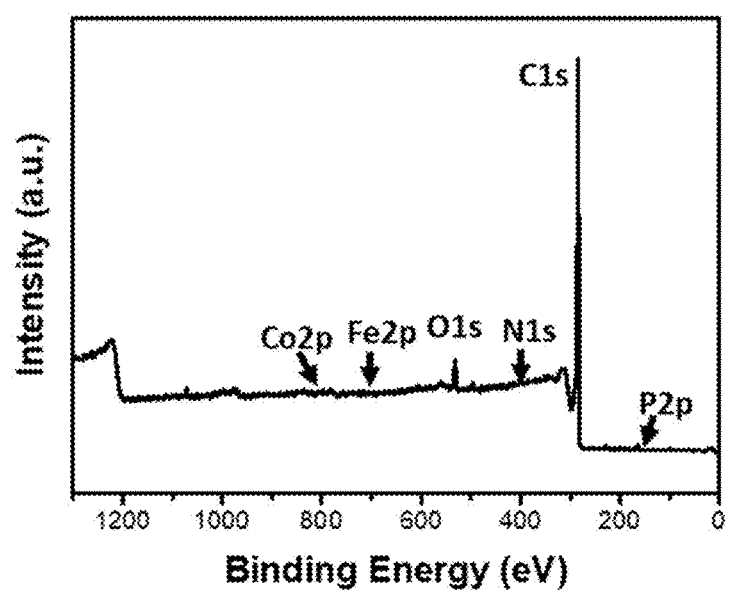
FIG. 16 shows an XPS survey scan for FeCo—NPCNTs-9 according to an aspect of the present disclosure.

FIG. 16 shows an XPS survey scan for FeCo—NPCNTs-9, according to an aspect of the present disclosure, and the corresponding elemental composition is shown in Table 3 below:

TABLE 3

Element composition of NPFeCo900-
VACNT-GF derived from survey scan.

| Element Peak | Atomic % |
|---|---|
| $C_{1s}$ | 94.37 |
| $O_{1s}$ | 4.06 |
| $P_{2p}$ | 0.15 |
| $N_{1s}$ | 1.02 |
| $Fe_{2p}$ | 0.15 |
| $Co_{2p}$ | 0.25 |

Figure 17A:
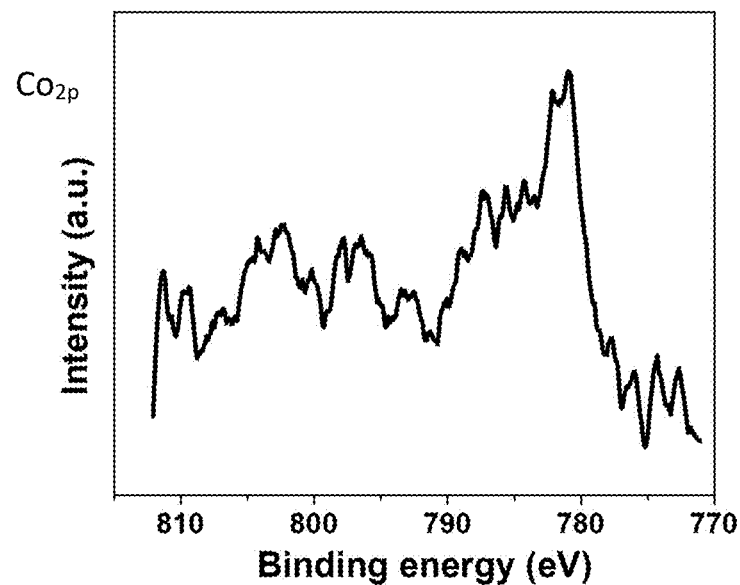
FIGS. 17A and 17B show XPS of Co$_{2p}$ and Fe$_{2p}$ spectra, respectively, for FeCo—NPCNTs-9 according to aspects of the present disclosure.
Figure 17B:
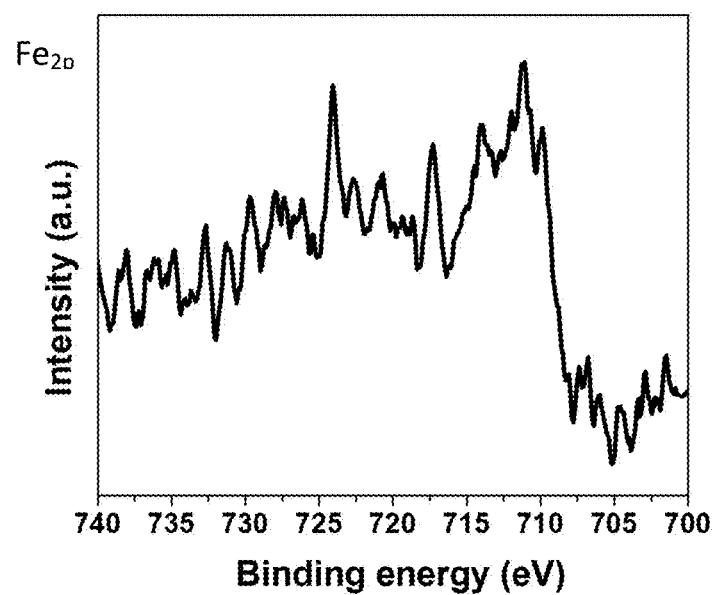

FIGS. 17 A and B show XPS of $Co_{2p}$ and $Fe_{2p}$ spectra, respectively, for FeCo—NPCNTs-9 according to an aspect of the present disclosure.

Brunauer-Emmett-Teller (BET) surface area analysis is a multi-point measurement of an analyte's specific surface area (m2/g) through gas adsorption analysis, where an inert gas (e.g., nitrogen) continuously flows over a solid sample, or the solid sample is suspended in a defined gaseous volume. Small gas molecules are adsorbed by the solid substrate and its porous structures due to weak van der Waals forces, forming a monolayer of adsorbed gas. This monomolecular layer, and the rate of adsorption, can be used to calculate the specific surface area of a solid sample and its porous geometry, informing studies into the reactivity.

Figure 18:
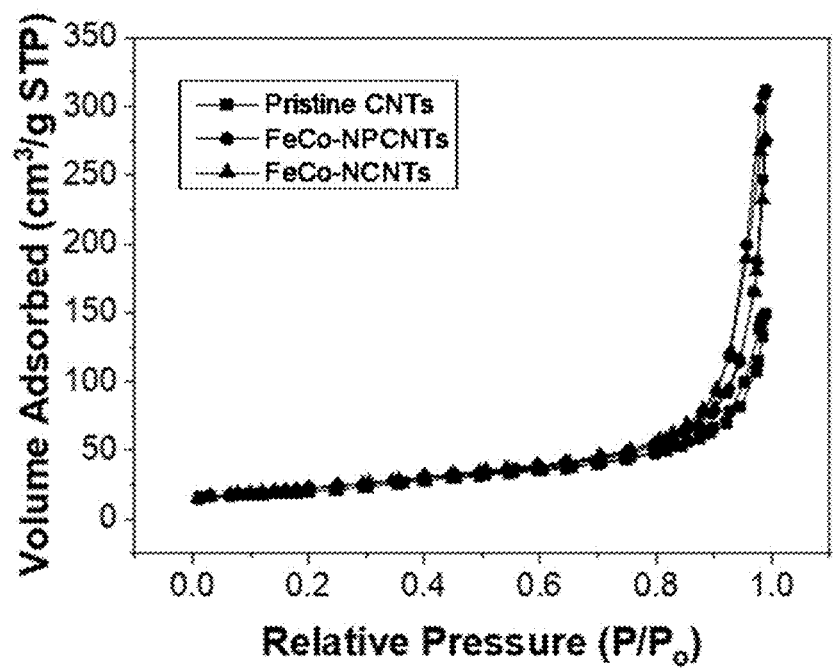
FIG. 18 shows Brunauer-Emmett-Teller (BET) isotherms for selected CNTs, including with and without P-doping, according to an aspect of the present disclosure.

In FIG. 18, the BET isotherms are shown for selected CNTs, including with and without P-doping by phytic acid, according to an aspect of the present disclosure. The BET isotherms show the surface area for pristine CNTs, FeCo—NCNTs and FeCo—NPCNTs were measured to be 69.15, 77.94, and 78.79 m2 g−1, respectively.

Figure 19:
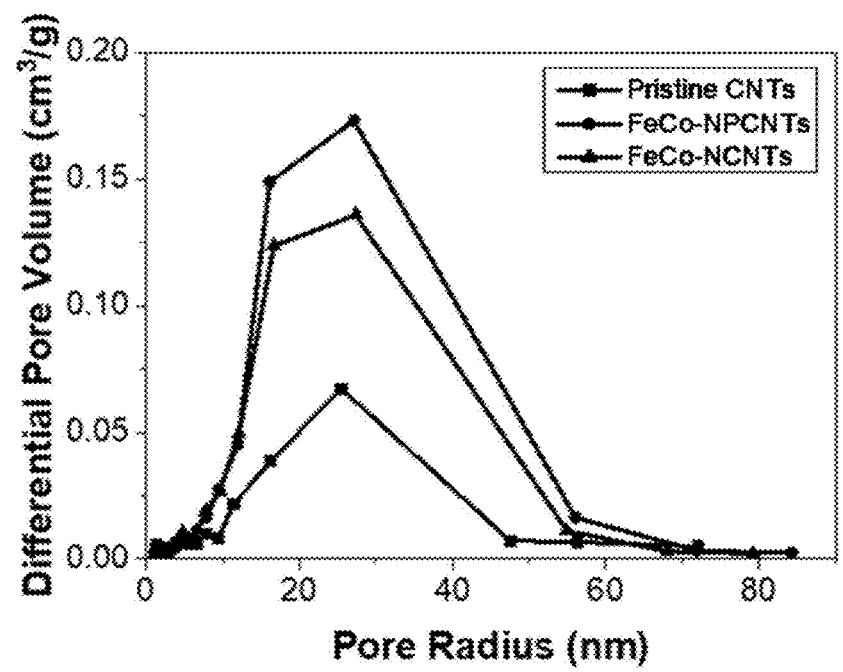
FIG. 19 shows BET pore size distribution for selected CNTs, including with and without P-doping, according to an aspect of the present disclosure.

According to an aspect of the present disclosure, FIG. 19 shows BET pore size distribution for selected CNTs, including with and without P-doping. The pore size distribution shows an increased pore volume in the mesoporous region of approximately 30 nm for FeCo—NPCNTs, which may be an increase in mesopore volume caused by phytic acid doping.

Figure 20:
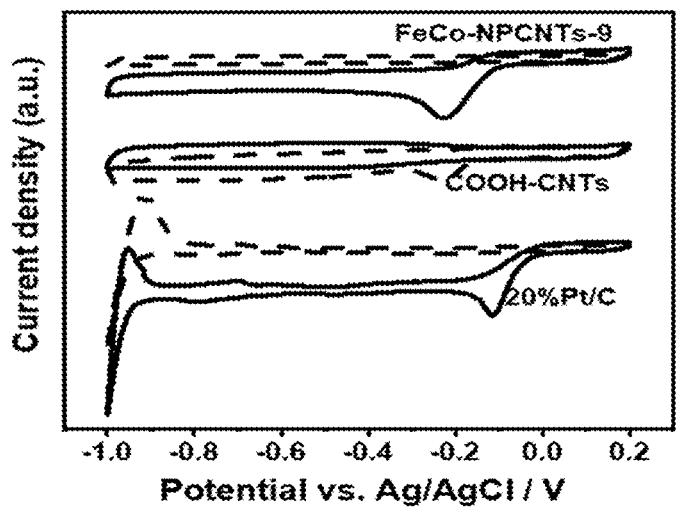
FIG. 20 shows cyclic voltammograms (CV) for FeCo—NPCNTs-9, COOH-VACNT-GF, and Pt/C materials according to an aspect of the present disclosure.

FIG. 20 shows cyclic voltammograms (CV) for FeCo—NPCNTs-9, COOH-VACNT-GF, and Pt/C materials according to an aspect of the present disclosure; To evaluate the ORR catalytic activity, CV tests were first conducted on FeCo—NPCNTs-9, mildly oxidized VACNTs-GF (COOH-VACNTs-GF), and 20 percent by weight Pt/C commercial catalyst in nitrogen-saturated and oxygen-saturated 0.1 m mol KOH as the electrolyte. In N2-saturated electrolyte, CV curves of FeCo—NPCNTs-9 and COOH-VACNT-GF samples show a rectangular shape corresponding to double-layer capacitance, indicating that no redox reaction occurred in the N2-saturated electrolyte, and the oxygen reduction peak is also absent for Pt/C samples in the N2-saturated electrolyte. In O2-saturated electrolyte, the CV curves for all samples show peaks corresponding to ORR reaction. The CV curves for FeCo—NPCNTs-9 samples have a peak at −0.10 V versus Ag/AgCl reference electrode. For COOH-VACNT/GF, those samples have a peak at −0.20V, and the 20% Pt/C samples have peaks at approximately −0.05V versus Ag/AgCl. This shows an improved ORR catalytic activity for FeCo—NPCNTs-9 as compared to COOH-VACNT/GF, which is becoming closer to that of Pt/C.

Figure 21:
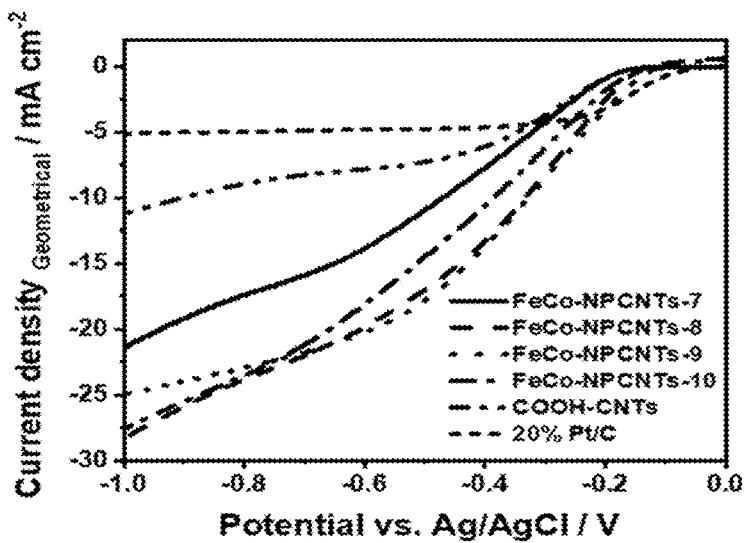
FIG. 21 shows Linear Sweep Voltammetry (LSV) curves for certain CNTs annealed at different temperatures according to an aspect of the present disclosure.
Figure 22:
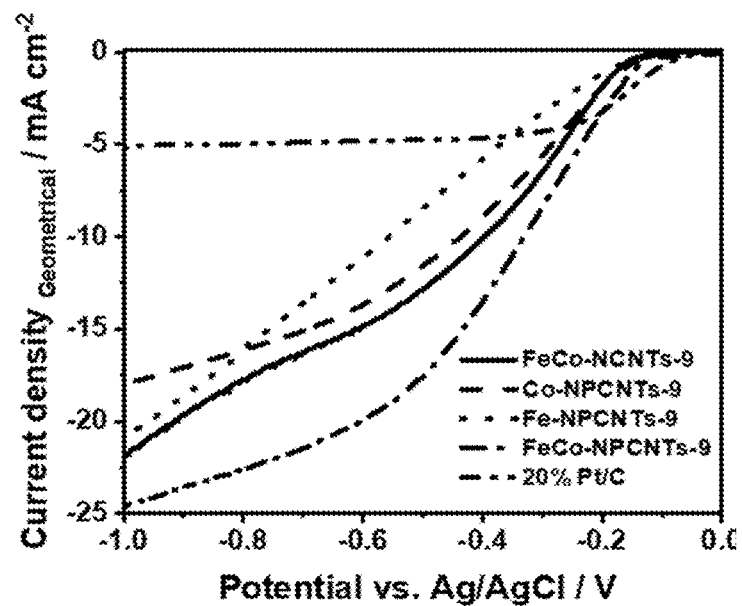
FIG. 22 shows LSV curves of samples with different dopants according to an aspect of the present disclosure.

FIGS. 21 and 22 show Linear Sweep Voltammetry (LSV) curves for certain CNTs annealed at different temperatures according to an aspect of the present disclosure. The ORR activities of the present catalysts were further investigated using the linear scanning voltammetry (LSV) technique. FIG. 21 shows the LSV curves of the FeCo—NPCNTs samples annealed at different temperatures, and COOH-VACNT-GF and 20% Pt/C as reference samples. All LSV curves were measured on an RDE with a rotation speed of 1600 rpm normalized to the geometrical area. The FeCo—NPCNTs samples annealed at temperatures higher than 800° C. showed relatively good catalytic activity, while the sample annealed at 900 shows the highest onset potential. In addition, FIG. 22 shows the effect of dopants on the catalytic activity of the sample. It can be seen that compared to samples without one of the elements the FeCo—NPCNTs-9 sample has both the highest onset potential and the largest limiting current.

Figure 23:
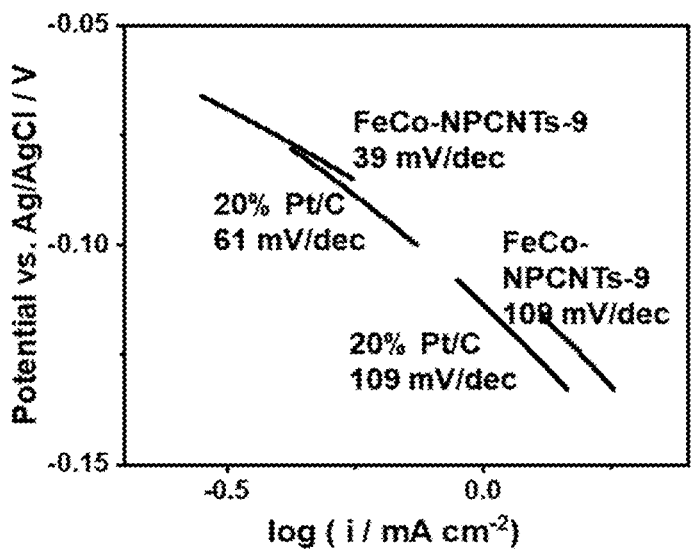
FIG. 23 shows Tafel plots of FeCo—NPCNTs-9 and Pt/C according to an aspect of the present disclosure.

FIG. 23 shows Tafel plots of FeCo—NPCNTs-9 and Pt/C according to an aspect of the present disclosure. For the high-coverage region, there is a significant difference in the Tafel slopes of the two samples that suggest different rate-limiting steps. For typical Pt-based catalysts, the initial electron transfer is the rate-limiting step, which results in two linear regions with Tafel slopes of approximately 60 and 120 mV/dec. The Tafel slope of the NPFeCo—CNT material, on the other hand, suggests that the last electron transfer and the detachment of reaction products from the surface of the catalyst is the rate-limiting step with a Tafel slope of approximately 40 mV/dec.

Figure 24:
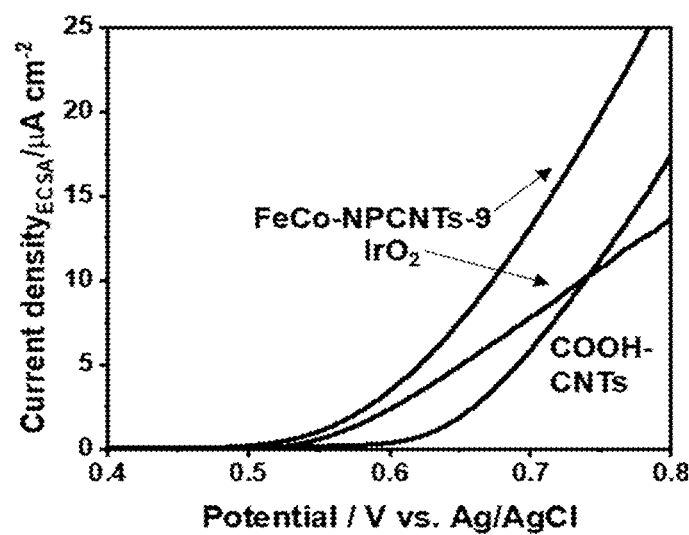
FIG. 24 shows OER performance plots of FeCo—NPCNTs-9, IrO$_2$, and COOH-VACNT-GF materials according to an aspect of the present disclosure.

As shown in FIG. 24, the OER performance plots for FeCo—NPCNTs-9 were measured and compared with $IrO_2$ and COOH-VACNT-GF as reference samples. It can be seen that the OER performance of FeCo—NPCNTs-9 on RDE was comparable to commercial $IrO_2$ at lower overpotentials and better at high overpotentials. The present FeCo—NPCNTs-9 catalyst also shows a significant improvement in OER performance compared to COOH-VACNT-GF samples.

Figure 25:
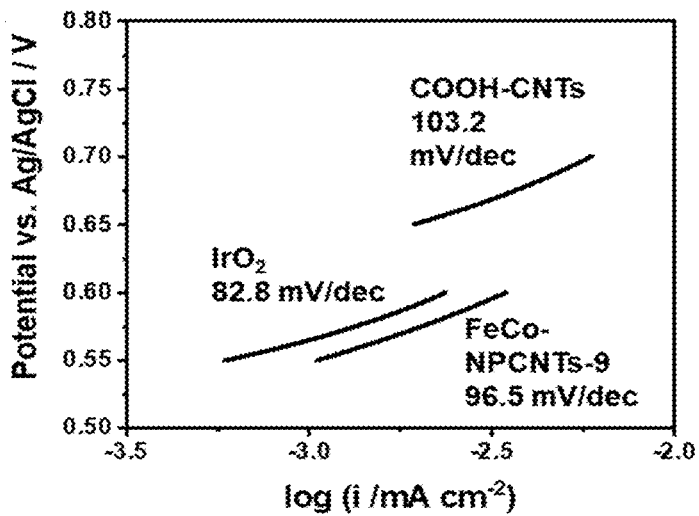
FIG. 25 shows Tafel plot of FeCo—NPCNTs-9, IrO$_2$, and COOH-VACNT-GF materials according to an aspect of the present disclosure.

FIG. 25 shows Tafel plots for FeCo—NPCNTs-9, $IrO_2$, and COOH-VACNT-GF samples, according to an aspect of the present disclosure, which corresponds with FIG. 25. The Tafel slopes of FeCo—NPCNTs-9, COOH-VACNT-GF, and IrO2 samples were 96.5, 103.2, and 82.8 mV/dec, respectively, showing that the IrO2 samples still have better intrinsic catalytic activity, while the good performance of the FeCo—NPCNTs-9 sample can be credited to its favorable structure.

Figure 26:
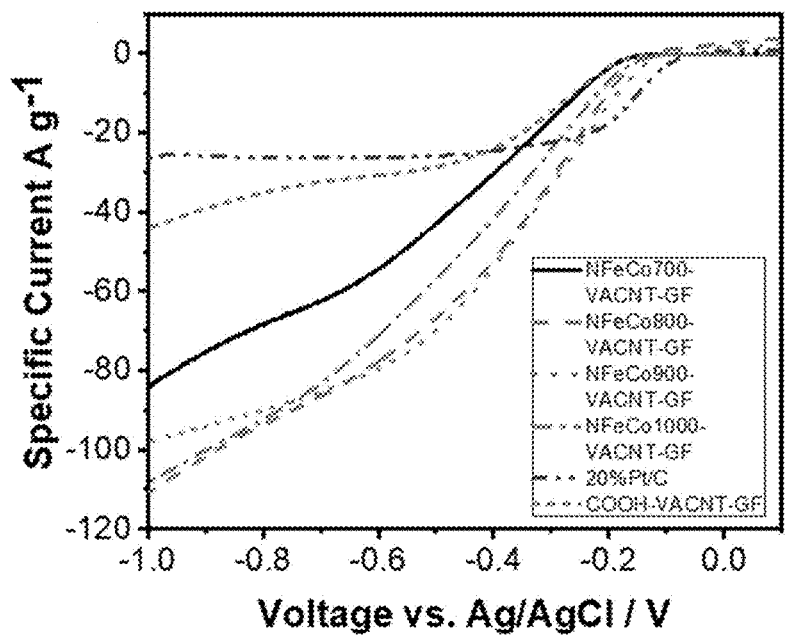
FIG. 26 shows LSV curves for selected CNTs annealed at different temperatures and Pt/C according to another aspect of the present disclosure.

FIG. 26 shows LSV curves for selected CNTs annealed at different temperatures and Pt/C according to another aspect of the present disclosure.

Figure 27:
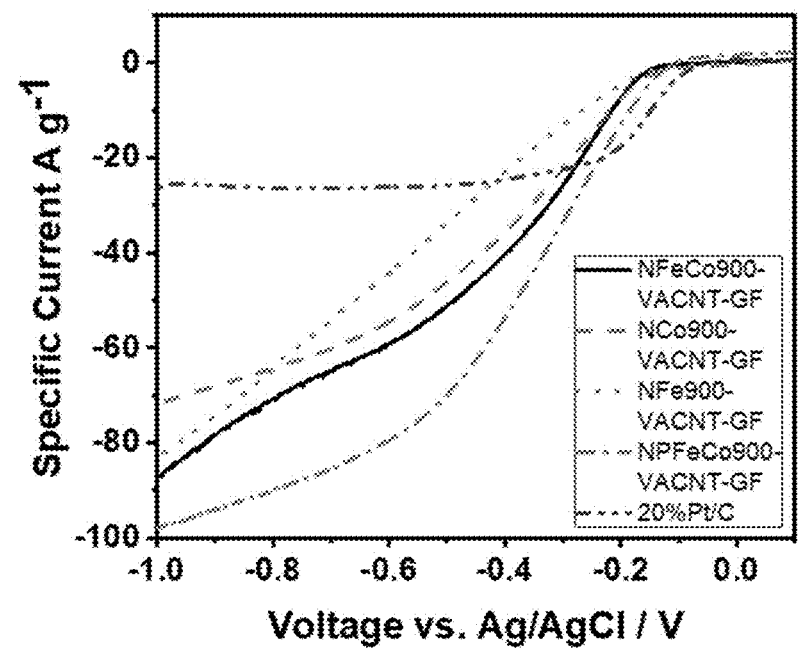
FIG. 27 shows LSV curves for selected CNTs with different dopants and Pt/C according to another aspect of the present disclosure.

FIG. 27 shows LSV curves for selected CNTs with different dopants and Pt/C according to another aspect of the present disclosure.

Figure 28A:
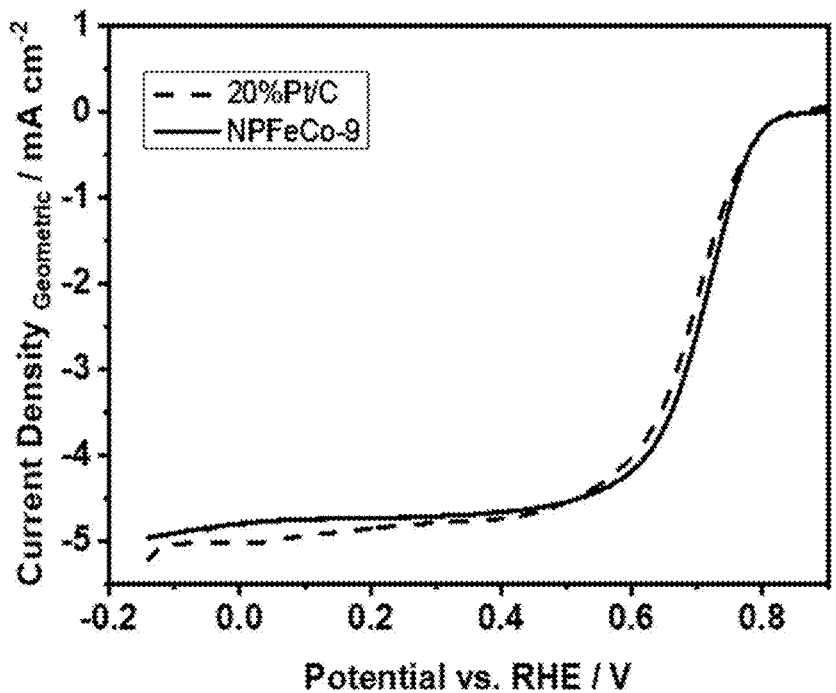
FIGS. 28A and 28B show LSV curves and Tafel plot of FeCo—NPCNTs and Pt/C, respectively, according to other aspects of the present disclosure.
Figure 28B:
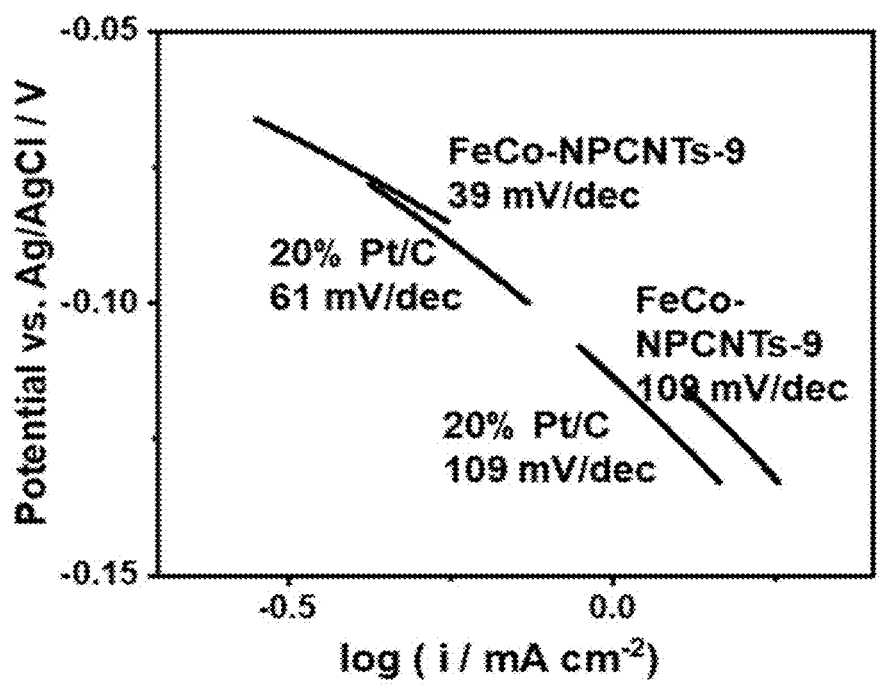

According to another aspect of the present disclosure, FIGS. 28A and 28B show LSV curves and Tafel plot of FeCo—NPCNTs and Pt/C, respectively. In the present disclosure, all LSV curves were measured on an RDE with a rotation speed of 1600 rpm. The LSV curves and Tafel plot show that the FeCo—NPCNTs have comparable performance with commercial Pt/C. In particular, the Tafel plot shows linear regions corresponding to high and low oxygen adsorption coverage, which are the expected results. For the high-coverage region, there is a significant difference in the Tafel slope between the two test batches that suggest there are different rate-limiting steps.

For typical Pt-based catalysts, the initial electron transfer is a rate-limiting step, which results in two linear regions with Tafel slopes of approximately 60 and 120 mV/dec. On the other hand, the Tafel slope of the FeCo—NPCNT suggests that the last electron transfer and the detachment of reaction products from the surface of the catalyst is the rate-limiting step with a Tafel slope of approximately 40 mV/dec. The FeCo—NPCNTs catalyst annealed at temperatures higher than 800° C. showed relatively good catalytic activity, while those annealed at 900° C. showed the highest onset potential.

Figure 29:
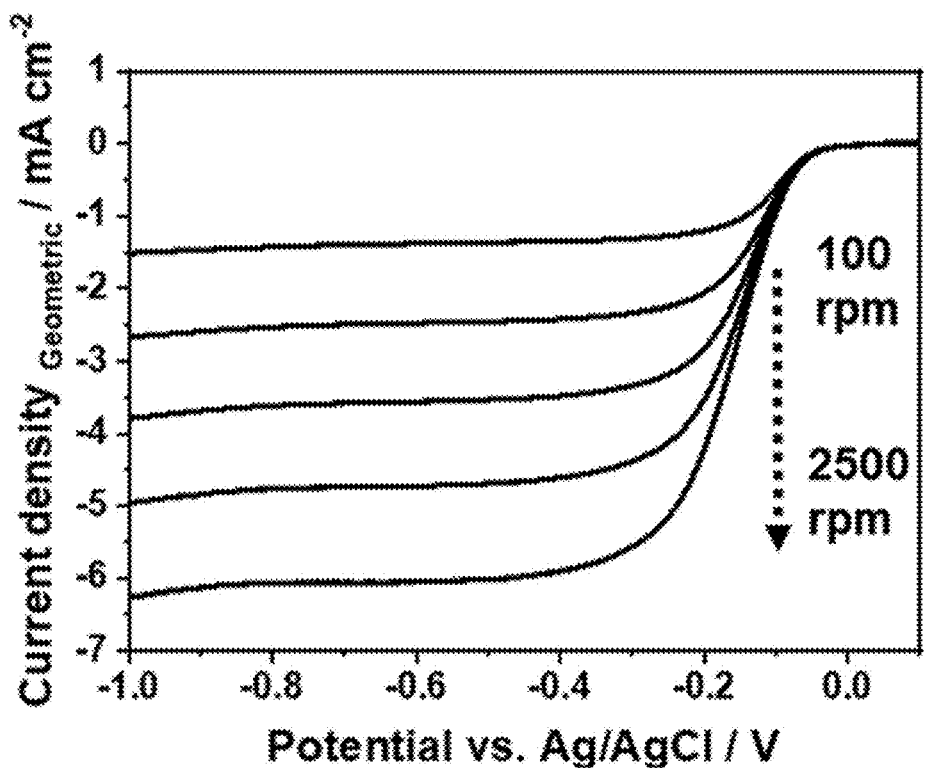
FIG. 29 shows LSV curves of FeCo—NPCNTs with different rotating speeds.
Figure 30:
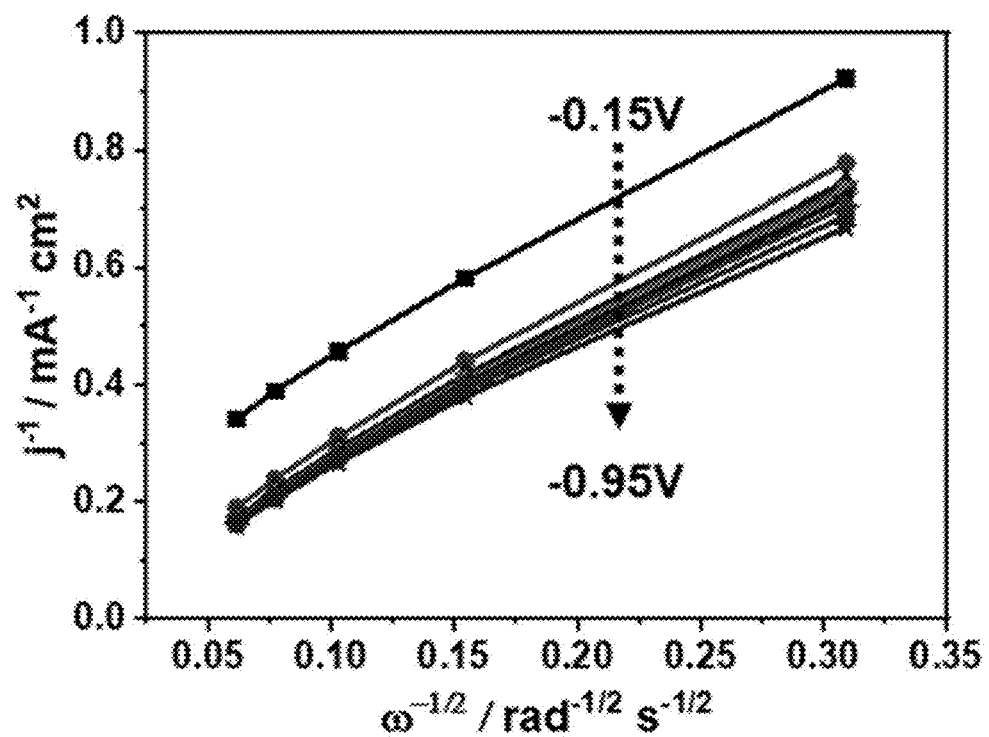
FIG. 30 shows K-L plots of FeCo—NPCNTs-9 at different potentials.
Figure 31:
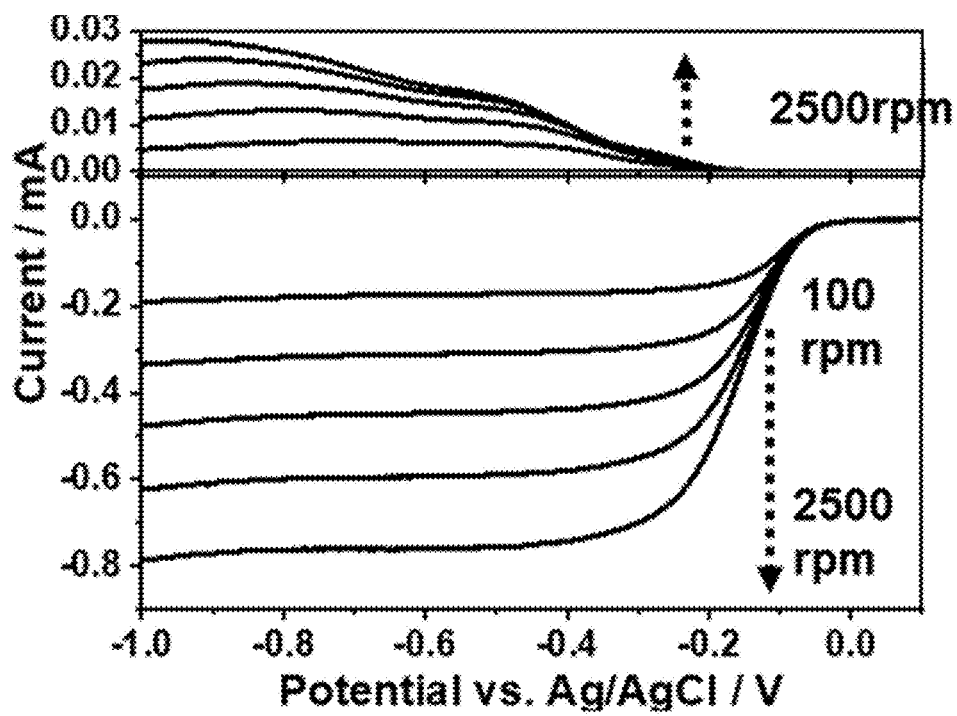
FIG. 31 shows rotating ring-disk electrode (RDE) measuring result of FeCo—NPCNTs-9.
Figure 32:
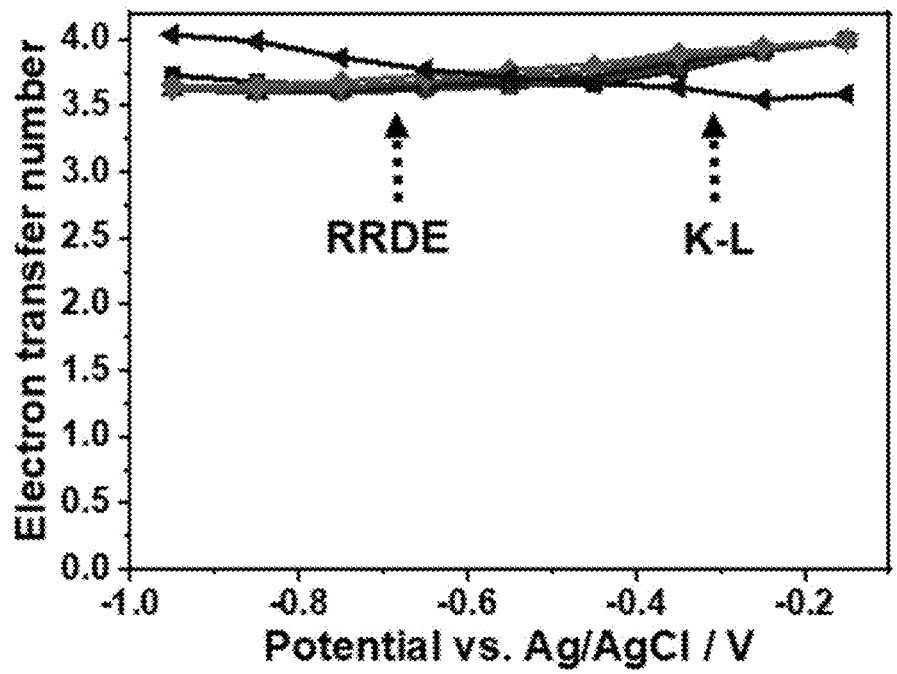
FIG. 32 shows electron transfer numbers calculated from the Koutecký-Levich (K-L) equation and RDE measurement, respectively, according to an aspect of the present disclosure.

In further aspects of the present disclosure, FIGS. 29 through 32 show the results of measurements for FeCo—NPCNTs using different techniques. FIG. 29 shows the LSV scan of FeCo—NPCNT-9 powder batches under different scan rates (i.e., rotating speeds). In FIG. 30, the K-L plots provide results at a range of different potentials. The Koutecký-Levich equation models the measured electric current at an electrode from an electrochemical reaction in relation to the kinetic activity and the mass transport of reactants. In FIG. 31, the results show the use of RDE to provide the electron transfer numbers. FIG. 32 shows the electron transfer numbers derived from both RDE and K-L plots. The electron transfer number overall was close to 4, indicating the good catalytic activity of the present FeCo—NPCNT catalyst.

According to the present disclosure, the CNT surface is rich in mesopores that improves the reaction volume and graphitic edges that further boosts the activity, resulting in the FeCo—NPCNT catalyst achieving a similar activity to commercial Pt/C and having a peak power density of 95 mW $cm^2$, as compared with cells made with commercial Pt/C that have only 57 mW $cm^2$. On the other hand, the FeCo—NPCNTs material has a cost of USD 130 to 150 per kg, which is similar to other multi-wall carbon nanotubes. which is only slightly higher than $MnO_2$ and delivers a similar activity to Pt/C.

In Table 4 below, the activity of different catalysts may offer a basis for comparison with the present FeCo—NPCNT catalysts. It is worth noting, however, that many published results do not specify the conditions of testing, which makes comparison difficult given the performance of ZABs are very sensitive to the testing conditions; especially the concentration of oxygen that is present.

TABLE 4

Performance of Other Catalysts

| Material | Performance | Cycle life | Structure | Condition |
|---|---|---|---|---|
| N-VACNT-GF | 63 mW $cm^{-2}$ | 35 h | Free-standing | Ambient |
| MOF-derived Co4N carbon composite | 135 mW $cm^{-2}$ Voltage gap 0.84 V | 10 mA $cm^{-2}$ at 20 min per cycle, 136 h | Free-standing | Ambient |
| Co-polydopamine-carbon composite | Voltage gap 0.94 V | Over 500 cycles (500 h), voltage gap increased by 0.23 V | Powder | Ambient |
| Fe/$Fe_2O_3$@Fe—N—C— | 1.01 V voltage gap with ORR @ 3.0 mA · $cm^{-2}$ and OER @ 10 mA · $cm^{-2}$ | 10 h | Powder | Not mentioned |
| $Co_3FeS_{1.5}(OH)_6$ | 113.1 mW $cm^{-2}$ Voltage gap 0.86 V @ 20.0 mA $cm^{-2}$ | 108 cycles 36 h@ 2 mA $cm^{-2}$ | Powder | Not mentioned |
| MnS/Co nanofiber | Voltage gap 0.98 V @ 10.0 mA $cm^{-2}$ | 110 h @10 mA $cm^{-2}$ | Free-standing | Ambient |
| NiFeO@MnOx core-shell structures | Voltage gap 0.56 V @ 2 ma $cm^{-2}$ | 100 pulse cycles @ 2 ma $cm^{-2}$ | Powder | Not mentioned |
| S, N—Fe/N/C-CNTs | 102.7 mW $cm^{-2}$ | 100 pulse cycles @ 5 mA $cm^{-2}$ | Powder | Not mentioned |
| Ni—Fe nitride nanoplates on N-doped graphene | Voltage gap 0.77 V @ 10 mA $cm^{-2}$ | 30 h | Powder | Pure oxygen |
| 3D ordered mesoporous $Co_3O_4$ | 73 mW $cm^{-2}$ | 200 cycles (400 h) @10 mA $cm^{-2}$ | Powder | Pure oxygen |
| Mesoporous Ni3FeN microspheres | Round-trip efficiency 67.1% and voltage gap 0.70 V | After 310 cycles (100 h), round-trip efficiency 63.2% a | Powder | Not mentioned |
| FeCo nanoparticles in N-doped CNTs | 97.6 mW $cm^{-2}$ | 40 h @ 100 mA$cm^{-2}$ | Powder | Not mentioned |
| Cu—Co oxide quantum dot on N-doped CNTs | 89.3 mW $cm^{-2}$ | 48 h, discharge voltage decreased by 0.03 V | Powder | Not mentioned |
| Fe/N/C and ZIF-67 derived material | 235 mW $cm^{-2}$, | 16 hrs | Powder | Not mentioned |

The fabrication methods and the choice of materials above are intended to illustrative and nonlimiting. It will be apparent to those ordinary skilled practitioners that the foregoing process operations may be modified without departing from the spirit of the present disclosure.

According to the present disclosure, the VACNT-GF composite with Fe and Co-based single atom catalytical active centers provide useful free-standing electrodes for ZABs. The doped are prepared by annealing of transition metal precursors, phytic acid, and PANI on mildly oxidized CNTs. The resulting FeCo—NPCNTs samples have single atom Fe and Co sites anchored on the outer walls of N and P doped CNTs, which results in high utilization of the Fe and Co catalytic sites.

The electrochemical characterizations performed were able to access the catalytic activity of present catalyst samples. According to the present disclosure, the FeCo—NPCNTs samples annealed at 900° C. shows the best catalytic activity, and that the N and P co-doping and co-existence of Fe and Co atoms are crucial to the good performance of FeCo—NPCNTs samples. The FeCo—NPCNTs-9 shows significantly higher peak power density and better cycling performance than similarly prepared electrodes based on commercial materials due to their high conductivity, high surface area, and favorable mass transfer properties. The rechargeable ZAB may achieve a stable operation of over 285 hours and 590 cycles, while the Pt/C//IrO2 cells achieved much less operational time. In conclusion, the FeCo—NPCNTs-9 is a highly effective single-atom catalyst for OER and ORR and shows excellent performance as a free-standing electrode for rechargeable ZABs with high power and energy densities and long cycle life.

It will be understood that any property described herein for a specific device may also hold for any device described herein. It will also be understood that any property described herein for a specific method may hold for any of the methods described herein. Furthermore, it will be understood that for any device or method described herein, not necessarily all the components or operations described will be enclosed in the device or method, but only some (but not all) components or operations may be enclosed.

The term "comprising" shall be understood to have a broad meaning similar to the term "including" and will be understood to imply the inclusion of a stated integer or operation or group of integers or operations but not the exclusion of any other integer or operation or group of integers or operations. This definition also applies to variations on the term "comprising" such as "comprise" and "comprises".

While the present disclosure has been particularly shown and described with reference to specific aspects, it should be understood by those skilled in the art that various changes in form and detail may be made therein without departing from the spirit and scope of the present disclosure as defined by the appended claims. The scope of the present disclosure is thus indicated by the appended claims and all changes which come within the meaning and range of equivalency of the claims are therefore intended to be embraced.

What is claimed is:

1. A catalyst for rechargeable energy storage devices comprising:
   a first transition metal and a second transition metal, wherein the first and second transition metals are formed on carbon nanotubes;
   the carbon nanotubes are doped with nitrogen (N) and phosphorous (P), wherein the carbon nanotubes have edges and interlayer spaces, and are axially aligned; and
   the first and second transition metals are formed as bimetal centers that are principally located at the edges or the interlayer spaces of the carbon nanotubes providing catalytically active sites.

2. The catalyst of claim 1, wherein the first and second transition metals are selected from the group comprising iron (Fe), cobalt (Co), nickel (Ni), manganese (Mn), and mixtures thereof.

3. The catalyst of claim 1, further comprising:
   the first transition metal is Fe; and
   the second transition metal is Co.

4. The catalyst of claim 3, wherein the bimetal centers further comprise catalytically active sites comprising single Fe and Co atoms having sub-nanometer or atomic scale, wherein the bimetal centers are uniformly distributed.

5. The catalyst of claim 1, wherein the catalytically active sites are bifunctional for oxygen evolution reactions and oxygen reduction reactions.

6. The catalyst of claim 1, wherein the carbon nanotubes are straight or spirally shaped having average diameters in the range of about 10 to 20 nm and average wall thickness of 5 to 10 nm, and is mesoporous with a layer thickness of 7 to 8 μm, wherein the interlayer spaces are separated by at least 0.4 nm.

7. A method for making a catalyst for rechargeable energy storage devices according to claim 1, the method comprising the steps of:
   forming carbon nanotubes on a template, wherein the carbon nanotubes have edges and interlayer spaces and are axially aligned;
   doping the carbon nanotubes with N and P; and
   providing a coating of first transition metal and a second transition metal precursors; and
   annealing the first and second transition metal precursors to form bimetal centers on carbon nanotubes, wherein the bimetal centers are catalytically active sites principally located at the edges or the interlayer spaces of the carbon nanotubes, wherein the interlayer spaces are separated by at least 0.4 nm.

8. The method of claim 7, wherein the first and second transition metals are selected from the group comprising Fe, Co, Ni, Mn, and mixtures thereof.

9. The method of claim 7, further comprising:
   the first transition metal is Fe; and
   the second transition metal is Co.

10. The method of claim 9, further comprising dipping the carbon nanotubes in a solution of Fe salt and Co salt to provide the coating of a first transition metal and second transition metal precursors.

11. The method of claim 7, wherein N doping the carbon nanotubes further comprises coating the carbon nanotubes with polyaniline or polyvinyl alcohol and a nitrogen source, wherein the nitrogen source comprises melamine or ammonia.

12. The method of claim 7, wherein P doping the carbon nanotubes further comprises coating the carbon nanotubes with phytic acid.

13. The method of claim 7, wherein the annealing is performed at a temperature range of 700 to 1000° C.; and
   wherein the bimetal centers are uniformly distributed.

14. The method of claim 9, further comprising placing the carbon nanotubes in an acid bath to remove inert iron oxides and cobalt oxides after the annealing step.

* * * * *